United States Patent
Terao et al.

(10) Patent No.: US 8,140,530 B2
(45) Date of Patent: Mar. 20, 2012

(54) SIMILARITY CALCULATION DEVICE AND INFORMATION SEARCH DEVICE

(75) Inventors: Makoto Terao, Minato-ku (JP);
Takafumi Koshinaka, Minato-ku (JP);
Shinichi Ando, Minato-ku (JP);
Yoshifumi Onishi, Minato-ku (JP)

(73) Assignee: NEC Corporation, Tokyo (JP)

( * ) Notice: Subject to any disclaimer, the term of this patent is extended or adjusted under 35 U.S.C. 154(b) by 444 days.

(21) Appl. No.: 12/374,035

(22) PCT Filed: Aug. 2, 2007

(86) PCT No.: PCT/JP2007/065140
§ 371 (c)(1),
(2), (4) Date: Jan. 15, 2009

(87) PCT Pub. No.: WO2008/016102
PCT Pub. Date: Feb. 7, 2008

(65) Prior Publication Data
US 2009/0319513 A1     Dec. 24, 2009

(30) Foreign Application Priority Data

Aug. 3, 2006  (JP) ................................. 2006-212659

(51) Int. Cl.
*G06F 7/00* (2006.01)
(52) U.S. Cl. ...................................................... 707/736
(58) Field of Classification Search .................. None
See application file for complete search history.

(56) References Cited

U.S. PATENT DOCUMENTS

| | | | | |
|---|---|---|---|---|
| 6,240,423 B1 * | 5/2001 | Hirata | | 1/1 |
| 6,366,296 B1 * | 4/2002 | Boreczky et al. | | 715/719 |
| 6,826,316 B2 * | 11/2004 | Luo et al. | | 382/305 |
| 7,043,474 B2 * | 5/2006 | Mojsilovic et al. | | 1/1 |
| 7,814,085 B1 * | 10/2010 | Pfleger et al. | | 707/708 |
| 2002/0069218 A1 * | 6/2002 | Sull et al. | | 707/501.1 |
| 2002/0168117 A1 * | 11/2002 | Lee et al. | | 382/305 |
| 2003/0004942 A1 * | 1/2003 | Bird | | 707/3 |
| 2003/0229896 A1 * | 12/2003 | Buczak | | 725/46 |
| 2003/0237093 A1 * | 12/2003 | Marsh | | 725/46 |
| 2004/0001081 A1 * | 1/2004 | Marsh | | 345/721 |
| 2004/0003403 A1 * | 1/2004 | Marsh | | 725/53 |
| 2004/0098362 A1 * | 5/2004 | Gargi | | 707/1 |
| 2004/0267693 A1 * | 12/2004 | Lowe et al. | | 707/1 |
| 2005/0091274 A1 * | 4/2005 | Stanford | | 707/104.1 |

(Continued)

FOREIGN PATENT DOCUMENTS

JP       08-069475 A       3/1996

(Continued)

*Primary Examiner* — Robert Timblin
*Assistant Examiner* — Richard Bowen
(74) *Attorney, Agent, or Firm* — Sughrue Mion, PLLC

(57) ABSTRACT

[PROBLEMS] To accurately calculate similarity between media data and a query even if the media data or its meta data has an error. [MEANS FOR SOLVING THE PROBLEMS] A similarity calculation device includes: a single score calculation device used when calculating similarity between first media data and a query, which calculates a single score that shows similarity between second media data different from the first media data and the query; an inter-media similarity calculation device which calculates inter-media similarity that shows the similarity between the second media data and the first media data; and a query similarity calculation device which obtains similarity between the first media data and the query by using the inter-media similarity of the second media data and the single score.

31 Claims, 15 Drawing Sheets

U.S. PATENT DOCUMENTS

| | | | |
|---|---|---|---|
| 2006/0050993 A1* | 3/2006 | Stentiford | 382/305 |
| 2006/0085399 A1* | 4/2006 | Carmel et al. | 707/3 |
| 2006/0271691 A1* | 11/2006 | Jacobs et al. | 709/228 |
| 2007/0106653 A1* | 5/2007 | Sun | 707/4 |

FOREIGN PATENT DOCUMENTS

| | | |
|---|---|---|
| JP | 10-289240 A | 10/1998 |
| JP | 2004-246824 A | 9/2004 |
| JP | 2005-070919 A | 3/2005 |

* cited by examiner

IMAGE QUERY 1

IMAGE QUERY 2

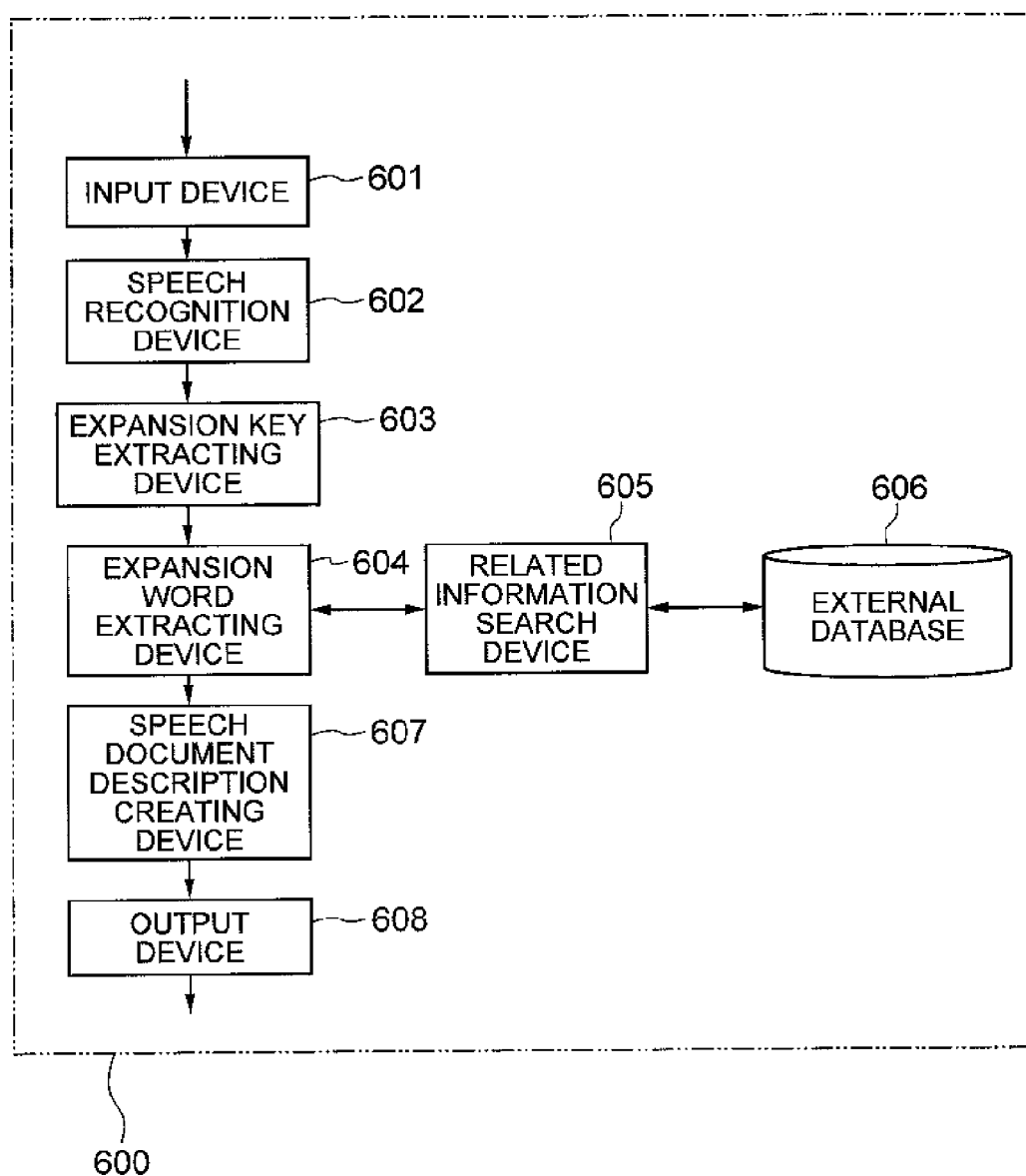

SIMILARITY CALCULATION DEVICE AND INFORMATION SEARCH DEVICE

CROSS-REFERENCE TO RELATED APPLICATIONS

This application claims priority from JP 2006-212659 filed on Aug. 3, 2006, which is incorporated herein by reference in its entirety.

TECHNICAL FIELD

The present invention relates to a similarity calculation device and an information search device. More specifically, the present invention relates to a similarity calculation device and an information search device, which calculate similarity between given media data and a query by using other media data that are different from the given media data.

BACKGROUND ART

Recently, a vast amount of various kinds of media data such as video, audio, image, and text data have come to circulate via various media, and the importance in searching techniques for finding those efficiently has become increased. When searching media data in general, a search query and media data are compared directly or the search query and meta data showing contents of the media data are compared to calculate similarity between the search query and the media data, and the media data similar to the search query is taken as a result of the search.

As examples of a case where a search query and media data are directly compared for searching the media data, there are a document search using a text query, a similar image search using an image query, and the like. In the meantime, when it is difficult to directly compare the search query with the media data, meta data added to the media data is utilized. "Meta data" is data that shows the contents of the media data. Even though the meta data may be created manually, it is desirable to be created automatically from the media data when a vast amount of data is the search target. For example, through putting spoken contents in the video/speech data into a text by speech recognition or putting images and character information in video/image data into a text by image recognition and letter recognition, it is possible to give the meta data to the video/audio/image data. This makes it possible to search the video/audio/image data also with the text query.

However, with the searches described above, the search accuracy becomes deteriorated if there is an error in the media data itself or in the meta data. For example, a mistyping in a document or a noise contained in image data can be considered an error in the media data itself. Because of those errors, the similarity between the search query and the document or the image cannot be calculated correctly. Thus, the accuracy of the document search and the similar image search becomes deteriorated. Further, when meta data is created by speech recognition or image recognition, errors are to be included in the meta data anyhow. Therefore, the similarity between the search query and the meta data cannot be calculated correctly, so that the search accuracy becomes deteriorated.

Now, an information search device depicted in Patent Document 1 will be described as an example of techniques related to coping with errors in meta data. This related information search device is a device for lightening deterioration in the search accuracy caused by the errors in the meta data generated due to misrecognition, when the meta data is created from video/audio data by speech recognition. As shown in FIG. 15, this related information search device 600 is configured with an input device 601, a speech recognition device 602, an expansion key extracting device 603, an expansion word extraction device 604, a related information search device 605, an external database 606, a speech document description creating device 607, and an output device 608.

The related information search device 600 operates as follows. That is, spoken contents of audio data inputted from the input device 601 are put into a text by the speech recognition device 602. The expansion key extracting device 603 extracts a predetermined part of speech and words that satisfy the condition of reliability from a recognition result text. The related information search device 605 searches the related text stored in the external database 606 by using the extracted expansion key. The expansion word extracting device 604 extracts important words from the searched related document as expansion words. The speech document description creating device 607 embeds the extracted expansion words to the recognition result text, and the output device 608 outputs it.

Flows of this operation will be described by referring to an example.

Considered is a case where the actual speech inputted from the input device 601 is "Hokkaido has been in a heavy snowfall because of a cold snap hitting there since last night, and schedules of public transportations such as flight services leaving from Shin-chitose airport were greatly disturbed", but the recognition result by the speech recognition device 602 turns out as "Hokkaido has been in a heavy snowfall because of a cold snap hitting there since the last sight, and schedules of public transportations such as flight services leaving from Shinchi-tosei airport were greedy disturbed".

In this case, the expansion key extracting device 603 extracts "cold snap, hit, Hokkaido, public transportations, disturb", for example, as highly reliable words that are nouns and verbs from the recognition result. The related information search device 605 searches the external database 606 by using those expansion keys. It is assumed that the expansion word extracting device 604 has extracted "Shin-chitose airport, cancelled flights, Hokkaido, cold snap, public transportations" as important words from the searched related document. The speech document description creating device 607 embeds those expansion words to the recognition result text, and the output device 608 outputs the recognition result text to which the expansion words are embedded as the meta text of the inputted speech data. With this, even when search is conducted with a text query "Shin-chitose airport" that is missed out from the recognition result because of misrecognition, for example, this speech data can be searched correctly since the similarity between the text query and the meta text can be increased because "Shin-chitose airport" is added to the meta text.

Patent Document 1: Japanese Unexamined Patent Publication 2004-246824

An issue of the related information search device is that given speech data may become searched with a query that is irrelevant to that speech data.

The reason is that there exits a text that is irrelevant to the meta text of the given data as a result of having a speech recognition error, so that it sometimes happens that the similarity between the speech data and the meta text is judged as large even with the query that is irrelevant to the speech data.

In the above-described case, there are wrong texts "tosei" and "greedy" in the meta text as the result of the speech recognition error. Therefore, the similarity between the query and the texts becomes large even when the search is conducted by using the query such as "tosei" or "greedy", which is irrelevant to the speech data. Therefore, this speech data is retrieved even though it is irrelevant to those queries.

An object of the present invention is to provide a similarity calculation device and the like, which can show small similarity between media data and a query when the media data and the query are irrelevant, even if some kinds of errors are contained in the media data or the meta data.

SUMMARY

In order to achieve the foregoing object, the similarity calculation device according to the present invention is a device for obtaining similarity between media data and a query. The similarity calculation device includes: a single score calculation device which calculates a single score that shows similarity between the query and second media data different from given media data; an inter-media similarity calculation device which calculates inter-media similarity that shows similarity between the given media data and the second media data; and a query similarity calculation device which obtains similarity between the given media data and the query by using the inter-media similarity and the single score.

Note here that "query" in this Description and the scope of the appended claims means data that is used for obtaining the similarity with respect to media data by making comparison with the search-target media data, the meta data thereof, etc., and also means logic combinations thereof (logical product, logical sum, and the like).

The object of the present invention can be achieved by employing such structure and operating to obtain the similarity between the given media data and the query by using the similarity between the given media data and the second media data that are different from the given data and by using the similarity between the second media data and the query.

The similarity calculation method according to the present invention is a method for obtaining similarity between media data and a query, which: calculates a single score that shows similarity between the query and second media data different from first media data; calculates inter-media similarity that shows similarity between the first media data and the second media data; and obtains similarity between the first media data and the query by using the inter-media similarity and the single score.

With the information search method according to the present invention, the similarity calculation device: calculates the similarity between the query and each of the research-target media data taken as the first media data; and creates a search result for the query based on the similarity.

The information search program according to the present invention enables a computer to execute: by the similarity calculation device, a function of calculating the similarity between the query and each of the research-target media data taken as the first media data; and a function of creating a search result for the query based on the similarity.

It is possible with the present invention to show the small similarity between given media data and a query at the time of finding the similarity between the given data and the query when the given media data and the query are irrelevant, even if some kinds of errors are contained in the given media data or the meta data.

BRIEF DESCRIPTION OF THE DRAWINGS

FIG. 15 is a block diagram showing the structure of a conventional information search device.

DETAILED DESCRIPTION

Next, exemplary embodiments of the invention will be described by referring to the accompanying drawings.

First Exemplary Embodiment

Figure 1:
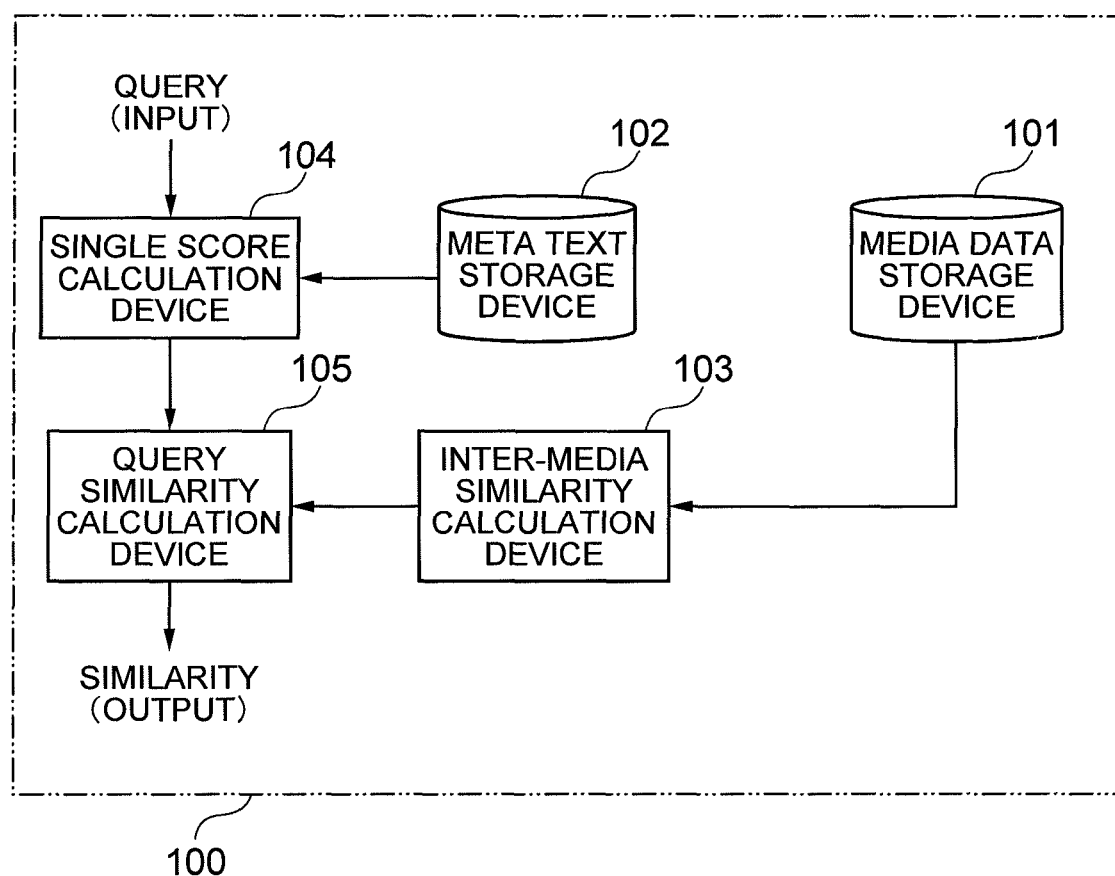
FIG. 1 is a block diagram showing the structure of a first best mode for embodying the present invention.

As shown in FIG. 1, a similarity calculation device 100 according to a first exemplary embodiment of the invention is a device for finding the similarity between given media data and a query, which is configured with: a single score calculation device 104 which calculates a single score that shows similarity between the query and second media data that is different from the given media data; an inter-media similarity calculation device 103 which calculates inter-media similarity that shows similarity between the given media data and the second media data; and a query similarity calculation device 105 which finds the similarity between the given media data and the query by using the inter-media similarity and the single score regarding the second media data.

A media data storage device 101 stores various media data including the given media data. A meta text storage device 102 stores the media data and meta texts showing the contents of the media data in a related manner. The media data storage device 101 and the meta text storage device 102 are not limited to be built-in to the similarity calculation device as in FIG. 1, but may be provided to an external server computer or the like which is connected to the similarity calculation device 100 via a network.

An inter-media similarity calculation device 103 calculates inter-media similarity that shows the similarity between the given media data and each of the media data (second media data) stored in the media data storage device 101. In this exemplary embodiment, the inter-media similarity is calculated by directly comparing the media data.

The single score calculation device 104 calculates the single score that shows the similarity between the query and each of the media data stored in the media data storage device 101. In this exemplary embodiment, the single score is calculated by comparing the query with the meta text that corresponds to the media data.

The query similarity calculation device 105 calculates the similarity between the given media data and the query by using the inter-media similarity between the given media data and each of the media data and by using the similarity with respect to the query.

Next, the overall operations of the exemplary embodiment will be described in details by referring to a block diagram of FIG. 1, a flowchart of FIG. 6, and an illustration of a specific example shown in FIG. 9.

In the explanations of the exemplary embodiment, it is assumed that the media data storage device 101 stores image data, and the meta text storage device 102 stores meta text data that describes each image data. Such meta text can be given manually, for example.

Figure 6:
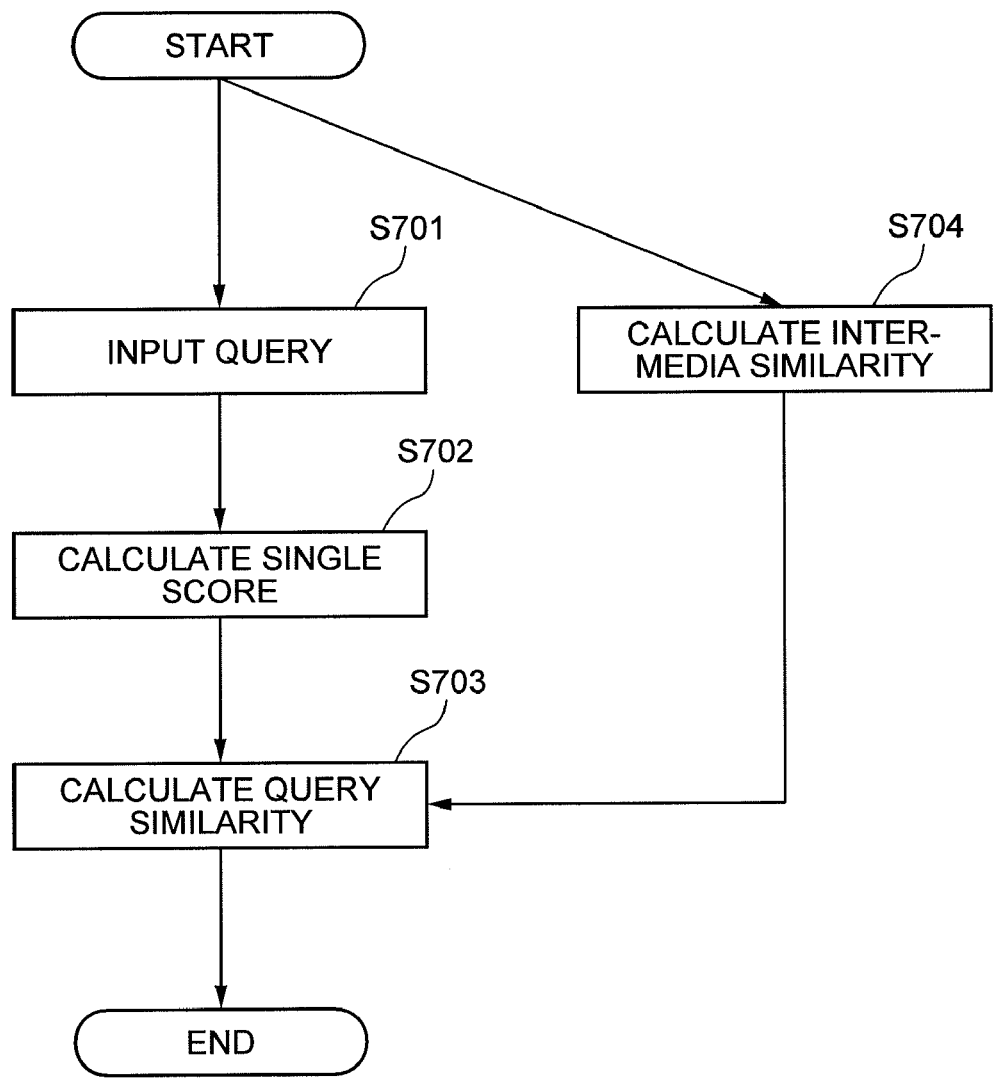
FIG. 6 is a flowchart showing the entire operations of the first and second best modes for embodying the present invention.

Considered herein is a case where a query is inputted for the image data stored in the media data storage device 101, and similarity between given image data i and the query is obtained (step 701 of FIG. 6: expressed as "S701" in the drawings, which applies for other steps as well). In this exemplary embodiment, it is assumed that the query is a text query. The text query may be inputted through a keyboard, may be inputted by making a speech spoken to a microphone into a text by speech recognition, or may be inputted through making characters drawn by a touch pen into a text by character recognition. Alternatively, the exemplary embodiment may be operated by using a text that is automatically created by some kinds of programs as a query.

First, the inter-media similarity calculation device 103 calculates the inter-media similarity that shows the similarity between the image data i and each of the image data stored in the media data storage device 101 (step 704 of FIG. 6). The inter-media similarity between the image data can be calculated by using a widely used technique, such as by making a comparison through extracting a color layout descriptor from the image, for example. The similarity calculation between the image data by the inter-media similarity calculation device 103 (step 704 of FIG. 6) may not always have to be executed after the query is inputted. The similarities between all the images stored in the media data storage device 101 may be calculated in advance.

In the meantime, the single score calculation device 104 calculates the single score that shows the similarity between the query and each of the image data stored in the media data storage device 101 (step 702 of FIG. 6). In this exemplary embodiment, the single score is calculated depending on whether or not the query and the meta text of each image data matches with each other. For example, it is so defined that the single score is "1" when the both match with each other, and the single score is "0" when the both do not match with each other. When a text query or a meta text is a document, however, it is also possible to calculate the single score by using a well-known inter-document similarity calculating method such as a cosine similarity method using a document vector.

The query similarity calculation device 105 uses the inter-media similarities and the single scores calculated for each image data in the manner described above to find the similarity between the image i and the query (step 703 of FIG. 6). Provided that the image data whose similarity with respect to the query is to be found is "i", a set of image data is "M", and the single score of image data j with respect to query q is "s(q, j)", the similarity "score(q, i)" between the image data i and the query q is calculated as in following Expression 1, for example.

$$\text{score}(q, i) = \sum_{j \in M, j \neq i} f(i, j) \times s(q, j) \qquad \text{Expression 1}$$

Note here that "f(i, j)" is a weight showing the importance of the single score of the image data j, and it is the similarity between the image data i and the image data j calculated by the inter-media similarity calculation device 103. With this, the similarity "score(q, i)" between the image data i and the query q takes a large value when many of other image data that have large similarity between the image data i have the similarity with respect to the query q. As a result, it is possible to achieve a similarity calculation that is robust to errors of the meta text of the image data i itself.

The operations and effects of the exemplary embodiment will be described in a concretive manner by using FIG. 9.

Figure 9:
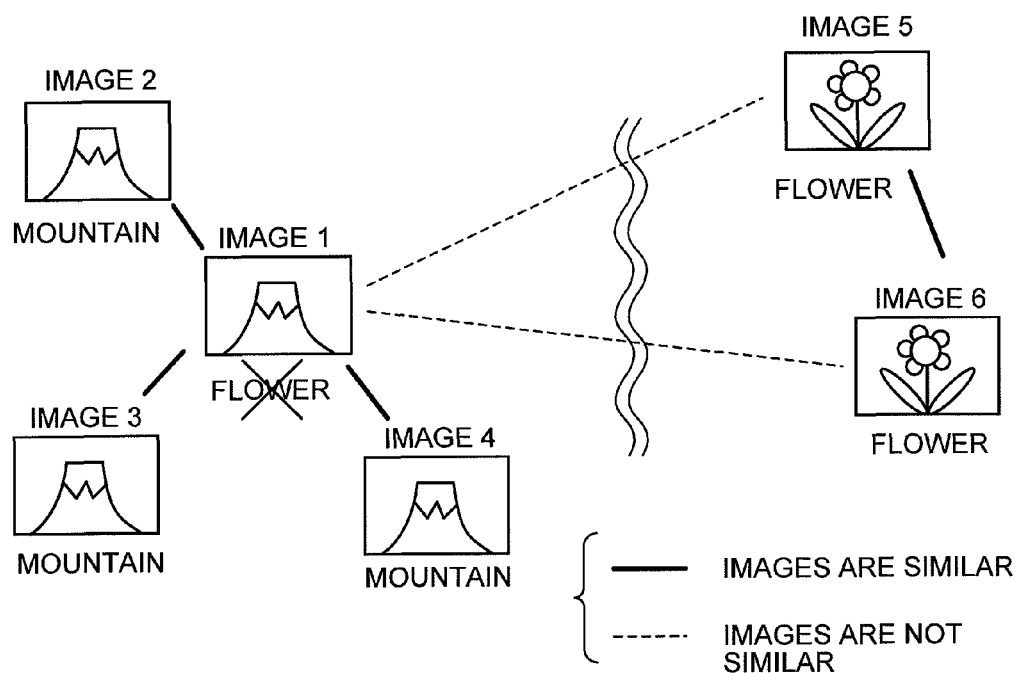
FIG. 9 is an illustration showing a specific example of the first best mode for embodying the present invention.

FIG. 9 is an illustration where six images having meta texts that show the contents of the images are arranged schematically on a plane based on the similarity between the images calculated by the inter-media similarity calculation device 103. That is, in FIG. 9, images 1-4 (images regarding mountains, for example) arranged close to each other as well as image 5 and image 6 (images regarding flowers, for example) have similarity with respect to each other. In the meantime, images in the image 1 and the image 5 and the like are not similar to each other (in the drawing, similar images are connected with a solid line, while images that are not similar to each other are connected with a broken line). Further, texts "mountain" and "flower" written beneath the images are the meta texts given to each image. It is assumed here that the meta text "flower" is mistakenly given to the image 1, even though it is supposed to be "mountain" (X is applied to the wrong meta text in FIG. 9 as well as in FIG. 12 or FIG. 13). This can be considered an error that is made when creating the meta text manually or an error made when the meta text is automatically created by image recognition, etc.

Here, considered is to find the similarity with respect to the image 1 by inputting the text query "flower". When the meta text of the image 1 and the query are simply compared as it is usually done, the both match with each other. Therefore, it is judged that there is similarity between the query "flower" and the image 1, even though the meta text "flower" given to the image 1 is wrong. As a result, the image 1 that is actually "mountain" is mistakenly searched with the query "flower" in an applied case such as an image search or the like.

In this exemplary embodiment of the invention, first, the single score calculation device 104 calculates the single scores of each image data by comparing the meta texts of each image data with the query "flower". In FIG. 9, the meta texts "flower" of the images 5 and 6 match with the query, so that the single scores of those images are "1", for example. That is, those can be expressed as "s(flower, 5)=1" and "s(flower, 6)=1". In the meantime, the meta texts "mountain" of the images 2-4 do not match with the query, so that the single scores of those images are "0". That is, those can be expressed as "s(flower, 2)=0", "s(flower, 3)=0", and "s(flower, 4)=0".

Next, the query similarity calculation device 105 calculates the similarity "score (flower, 1)" between the image 1 and the query "flower" according to Expression 1. Provided that in FIG. 9 the similarity between the image 1 and the images 2, 3, 4 connected with solid lines is "1" and the similarity between the image 1 and the images 5, 6 connected with broken lines is "0", those can be expressed as "f(1, 2)=1", "f(1, 3)=1", "f(1, 4)=1", "f(1, 5)=0", and "f(1, 6)=0". When those are substituted to Expression 1, "score (flower, 1)=0" can be obtained. Thus, it can be judged that there is no similarity between the image 1 and the query "flower". This is because the images that are similar to the image 1 have small single scores for the query "flower".

In the meantime, for finding the similarity with respect to the image 1 by inputting the text query "mountain", the similarity between the image 1 and the query "mountain" takes a value as large as "3" with completely the same calculation that has been described above. Thus, it can be judged that there is similarity between the image 1 and the query "mountain". This is because the images that are similar to the image 1 have large single scores for the query "mountain".

As described above, even if a wrong meta text is given to given image data, it is possible with the exemplary embodiment of the invention to find the correct similarity between the given image data and the query through using the single scores of other image data that are similar to the given image data. This is achieved because it can be expected that the correct meta text be given to most of the other image data that are similar to the certain image data.

Through the use of the similarity between the image data and the image data j as "f(i, j)" of Expression 1, it is possible to put more emphasis on the single score of the other image data that is closest to the image data i. In other words, it is possible to reflect more expectation that it is closer to the similarity between the image data i and the query, when there is similarity between the query and the image data that is most similar to the image data i. This makes it possible to obtain a proper value as the similarity between the image data i and the query.

Further, "f(i, j) may be calculated as in following Expression 2, for example.

$$f(i, j) = \begin{cases} d_{ij} & \dots d_{ij} \geq t \\ 0 & \dots d_{ij} < t \end{cases} \quad \text{Expression 2}$$

Note here that "$d_{ij}$" indicates the similarity between the image data i and the image data j calculated by the inter-media similarity calculation device 103, and "t" indicates a threshold value that defines what degrees of similarity with respect to the image data i are to be taken into consideration. Alternatively, instead of Expression 2, the weight "f(i, j)" may be given only to the image data j whose similarity "$d_{ij}$" between the image data falls within specific higher-order values, and "0" weight may be given for the image data j whose similarity falls within specific lower-order values.

In this manner, deterioration in the similarity calculation that uses the image data whose similarity with respect to the image i is low can be suppressed by using only the single scores of the image data whose similarity with respect to the image data i is considered large to an extent. Further, the weight "f(i, j)" may not necessarily have to be the inter-media similarity "$d_{ij}$" itself as in Expression 2, but may be a function that can adjust the weight depending on "$d_{ij}$".

Further, the similarity "score(q, i)" between the image data i and the query q may not necessarily have to be the form in Expression 1. For example, it may be a mean value of the single scores of other image data that are similar to the image data i.

Furthermore, when calculating the similarity between the image data i and the query q, the single score "s(q, i)" of the image data i itself may not have to be included. There may be also a case where a large weight is given to the single score of the image data i itself, if the reliability of the single score of the image data i itself is high.

While this exemplary embodiment has been described by referring to the case where the image data are considered as the media data, the present invention is not limited to the cases of having the image data as the media data. For example, when speech data are used as the media data, the same effects can be obtained through performing the same processing. In that case, the similarity between the speech data can be calculated as distances between cepstrum vectors showing the spectrum shapes of the voice waveforms, for example.

Next, effects of the exemplary embodiment will be described.

The exemplary embodiment uses the similarity between the query and the other media data that are similar to the given media data for finding the similarity between the given media data and the query. Thus, when the given media data is irrelevant to the query, it is possible to judge that the similarity therebetween is small even if the meta text of the given media data is wrong (in the case of the query "flower" in FIG. 9). That is, this can be achieved because it can be expected that the similarity between the query and many of the other media data that are similar to the given media data is small if the given media data is irrelevant to the query.

Further, based on the same reason, when the given media data is relevant to the query, it is possible to judge that the similarity therebetween is large even if the meta text of the given media data is wrong (in the case of the query "mountain" in FIG. 9). That is, this can be achieved because it can be expected that the similarity between the query and many of the other media data that are similar to the given media data is large if the given media data is relevant to the query.

It is needless to say that the use of the similarity calculation device 100 described in the exemplary embodiment makes it possible to improve the search accuracy of the media data with the query and to correct the meta text that is given to the media data semi-automatically, etc.

Even if some kind of error is included in the given media data or the meta data when finding the similarity between the given media data and the query, it is possible with the exemplary embodiment to judge the similarity between the media data and the query to be small if the media data and the query are irrelevant.

The reason for this is that the similarity between the query and the other media data that are similar to the given media data are considered to be small if the given media data and the query are irrelevant, so that it is possible to judge that the similarity between the given data and the query as small by using the single scores of the other media data that are similar to the given media data.

Even if some kind of error is included in the given media data or the meta data when finding the similarity between the given media data and the query, it is possible with the exemplary embodiment to judge the similarity between the media data and the query to be large if the media data and the query are relevant.

The reason for this is that the similarity between the query and the other media data that are similar to the given media data are considered to be large if the given media data and the query are relevant, so that it is possible to judge that the similarity between the given data and the query as large by using the single scores of the other media data that are similar to the given media data.

Even if some kind of error is included in the given media data or the meta data when searching the media data with the query, media data that is irrelevant to the query is not mistakenly searched with the exemplary embodiment of the invention.

The reason for this is that the media data are searched by using the similarity calculation device with which the similarity between the media data and the query can be judged as small when the media data and the query are irrelevant, even if some kind of error is included in the given media data or the meta data when searching the media data with the query.

Even if some kind of error is included in the given media data or the meta data when searching the media data with the query, media data that is relevant to the query can be searched properly with the exemplary embodiment of the invention.

The reason for this is that the media data are searched by using the similarity calculation device with which the similarity between the media data and the query can be judged as large when the media data and the query are relevant, even if some kind of error is included in the given media data or the meta data when searching the media data with the query.

Second Exemplary Embodiment

Next, a similarity calculation device 200 according to a second exemplary embodiment of the invention will be described in detail by referring to FIG. 2.

Figure 2:
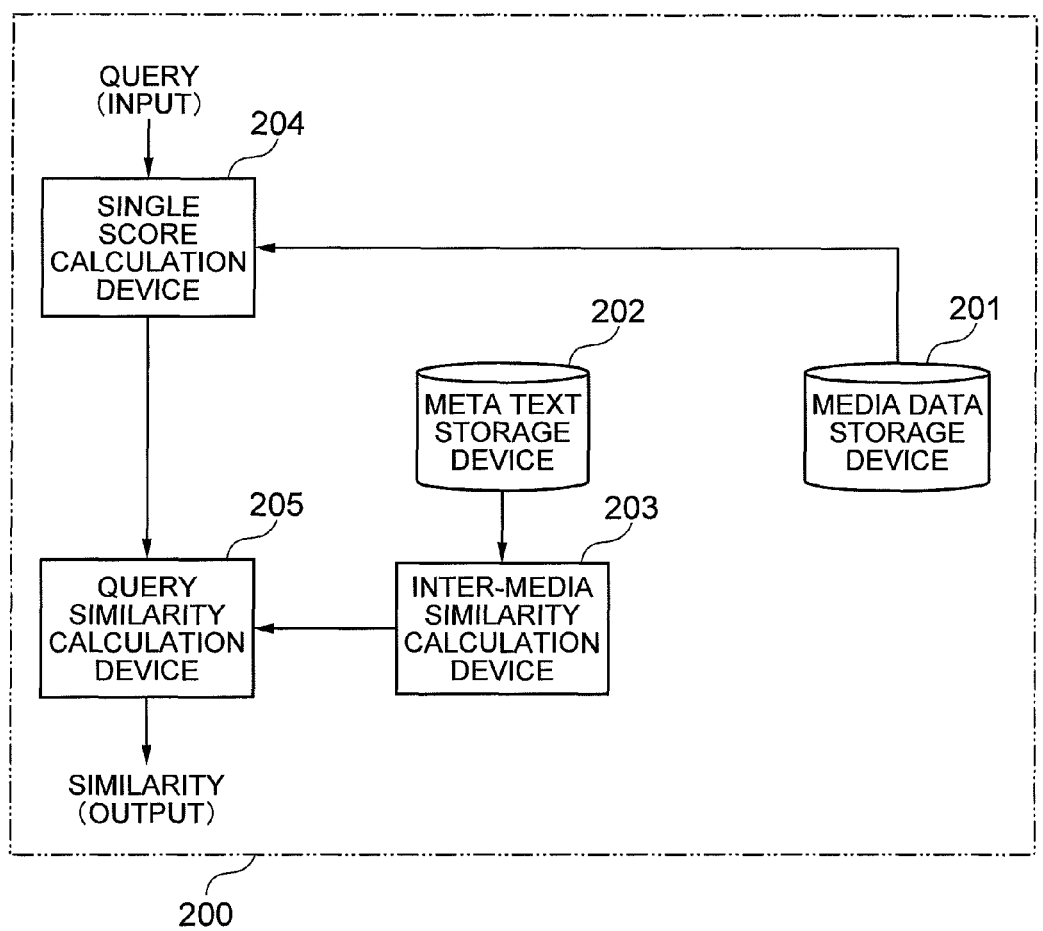
FIG. 2 is a block diagram showing the structure of a second best mode for embodying the present invention.

As shown in FIG. 2, the similarity calculation device 200 according to the second exemplary embodiment of the invention is a device for finding the similarity between given media data and a query, which is configured with: a single score calculation device 204 which calculates a single score that shows similarity between the query and a second media data that is different from the given media data; an inter-media similarity calculating device 203 which calculates inter-media similarity that shows similarity between the given media data and the second media data; and a query similarity calculating device 205 which finds the similarity between the given media data and the query by using the inter-media similarity and the single score regarding the second media data.

A media data storage device 201 stores various media data including the given media data. A meta text storage device 202 stores the media data and meta texts showing the contents of the media data stored in the media data storage device 201 in a related manner.

An inter-media similarity calculation device 203 calculates inter-media similarity that shows the similarity between the given media data and each of the media data stored in the media data storage device 201. In this exemplary embodiment, the inter-media similarity is calculated by comparing the meta texts of the media data.

The single score calculation device 204 calculates the single score that shows the similarity between the query and each of the media data stored in the media data storage device 201. In this exemplary embodiment, the single score is calculated by directly comparing the media data with the query.

The query similarity calculation device 205 calculates the given media data and the query by using the inter-media similarity regarding the given media data that is calculated for each of the media data and by using the similarity regarding the query.

Next, the overall operations of the exemplary embodiment will be described in details by referring to a block diagram of FIG. 2, the flowchart of FIG. 6, and illustrations of a specific example shown in FIG. 10 and FIG. 11.

In the explanations of the exemplary embodiment, it is assumed that the media data storage device 201 stores image data, and the meta text storage device 202 stores meta text data that describes each image data. Such meta text can be given manually, for example.

Considered herein is a case where a query is inputted for such data, and similarity between given image data i and the query is obtained (step 701 of FIG. 6). In this exemplary embodiment, it is assumed that the query is an image query.

First, the inter-media similarity calculation device 203 calculates the inter-media similarity that shows the similarity between the image data i and each of the image data stored in the media data storage device 201 (step 704 of FIG. 6). In this exemplary embodiment, the similarity between the image data is obtained by calculating the similarity between the meta texts that are stored in the meta text storage device 202. The similarity between the meta texts can be calculated by using a well-known technique such as a cosine similarity method using document vectors.

In the meantime, the single score calculation device 204 calculates the single score that shows the similarity between the query and each of the image data stored in the media data storage device 201 (step 702 of FIG. 6). The similarity between the image data and the image query can be calculated by using a widely-used technique, such as by extracting color layout descriptors from the images and comparing those, for example.

At last, the query similarity calculation device 205 obtains the similarity between the image i and the query by performing the same processing as that of the query similarity calculation device 105 of the similarity calculation device 100 (step 703 of FIG. 6).

The operations and effects of this exemplary embodiment will be described in a concretive manner by using FIG. 10 and FIG. 11.

Figure 10:
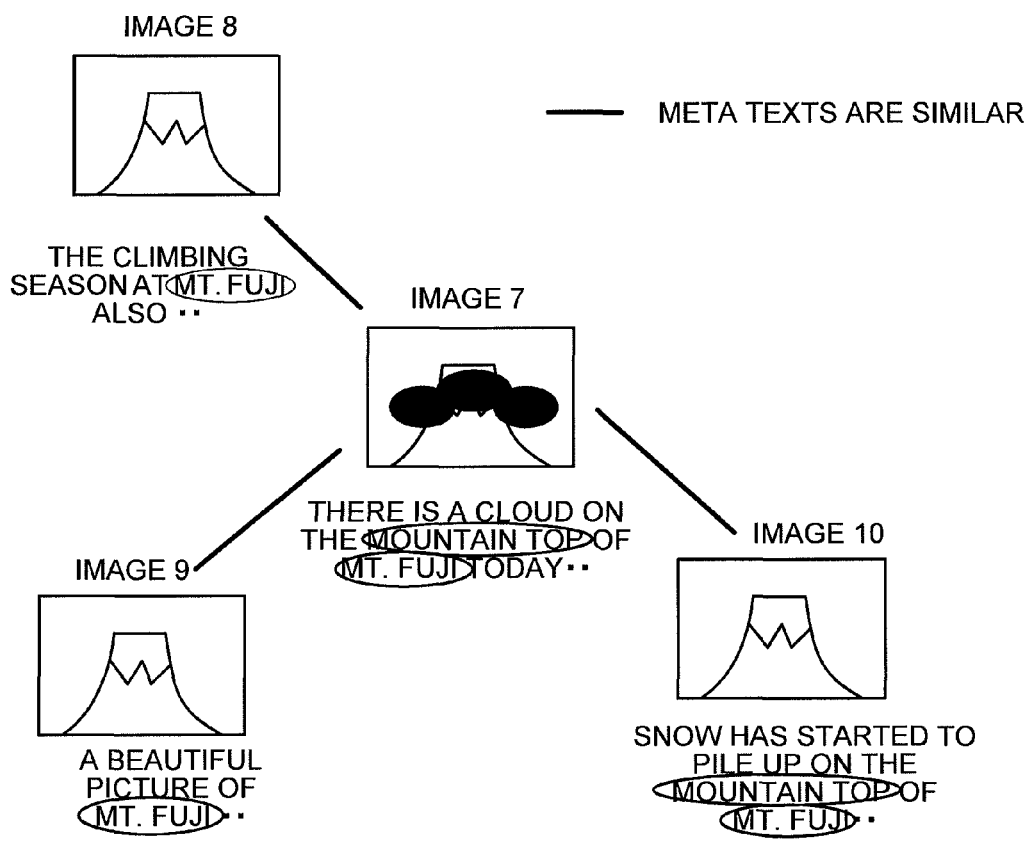
FIG. 10 is an illustration showing a specific example of the second best mode for embodying the present invention.

In FIG. 10, images 7-10 show images of Mt. Fuji, and a meta text for describing the image is given to each of the images. Only the image 7 shows cloud-covered Mt. Fuji (image with a noise). Images 8-10 are the images that are judged to have the similar meta texts as that of the image 7 by the inter-media similarity calculation device 203. That is, the meta texts of the images 7-10 contain words such as "Mt. Fuji" and "mountaintop" in common, so that it is judged that those image data are similar.

As described, while the similarity calculation device 100 of the first exemplary embodiment calculates the similarity between the image data based on the similarity between the images, the second exemplary embodiment calculates the similarity between the image data based on the similarity between the meta texts that are given to the images.

Figure 11:
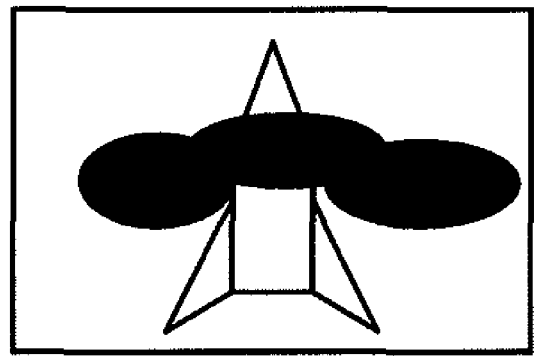
FIG. 11 is an illustration showing a specific example of the second best mode for embodying the present invention.
Figure 11:
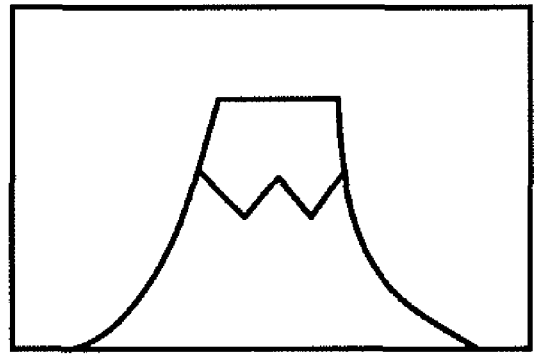

Here, considered is to find the similarity with respect to the image 7 by inputting an image query 1 that is shown in FIG. 11 as a query. The image query 1 is an image of a rocket that has a cloud covering thereover (image with a noise) as in the case of the image 7. Considering that the clouds (noises) of the images in the image query 1 and the image 7 are not the image data that are supposed to be presented (i.e., the cloud is an error of the image data), the similarity between the image 7 (Mt. Fuji) and the image query 1 (rocket) is supposed to become small. However, when the image query 1 and the image 7 are simply compared as the images as it is normally done conventionally, the similarity between the both may become large due to the effect of the cloud (noise) part.

In this exemplary embodiment, the single score calculation device 204 calculates the similarity between the images of the image query 1 and the image data 8-10. Since those images are completely different, the single scores of the images 8-10 are small. Therefore, when the query similarity calculation device 205 calculates the similarity between the image 7 and the query image 1 according to Expression 1, the value obtained thereby becomes small. Thus, it is judged that the image 7 and the image query 1 are not similar.

In the meantime, there is also considered a case of finding the similarity with respect to the image 7 by inputting an image query 2 that is shown in FIG. 11 as a query. The image query 2 is Mt. Fuji, so that it is desired to show large similarity with respect to the image 7 that is also the image of Mt. Fuji. However, it is considered that the similarity between the both may become small when the image 7 and the image query 2 are simply compared, because of the noise (cloud) in the image 7.

With this exemplary embodiment, the similarity between the image 7 and the image query 2 calculated according to Expression 1 becomes large, since the similarity between the image query 2 and the images 8-10 that have the meta text similar to that of the image 7. Therefore, it is judged that the image 7 and the image query 2 are similar.

As described above, it is possible with this exemplary embodiment to obtain the similarity between given image data and the query by using the single scores of other image data that have the meta text similar to that of the given image data, even if there is a noise in the given image data. This can be achieved because it can be expected that there is no noise in many of the other image data that have the meta text similar to that of the given image data.

By finding the similarity between the image data through calculating the similarity between the meta texts as in this exemplary embodiment, it is possible to give a weight to the single scores of the other image data according to the similarity in the contents of the meanings. As a result, it becomes possible with the exemplary embodiment to obtain the similarity between the given data and the query image according to the closeness of the contents of the meanings with respect to the query image. Further, there is also such an advantage that the use of similarity between the meta texts makes it possible to perform calculation more quickly than the case of calculating the similarity between the images.

Next, the effects of the exemplary embodiment will be described.

When finding the similarity between the given media data and the query, the exemplary embodiment uses the similarity between the query and the other media data that are similar to the give media data. Therefore, even if there is an error included in the given media data itself, the similarity can be judged as small if the media data and the query are irrelevant (case of the image query 1).

Further, due to the same reason, the similarity can be judged as large if the media data and the query are relevant, even if there is an error included in the given media data itself (case of the image query 2).

Furthermore, since the similarity between the media data is calculated based on the similarity between the meta texts, the similarity between given media data and the query can be obtained based on the closeness regarding the contents of the meanings.

Third Exemplary Embodiment

Next, a similarity calculation device 300 according to a third exemplary embodiment of the invention will be described in detail by referring to FIG. 3.

Figure 3:
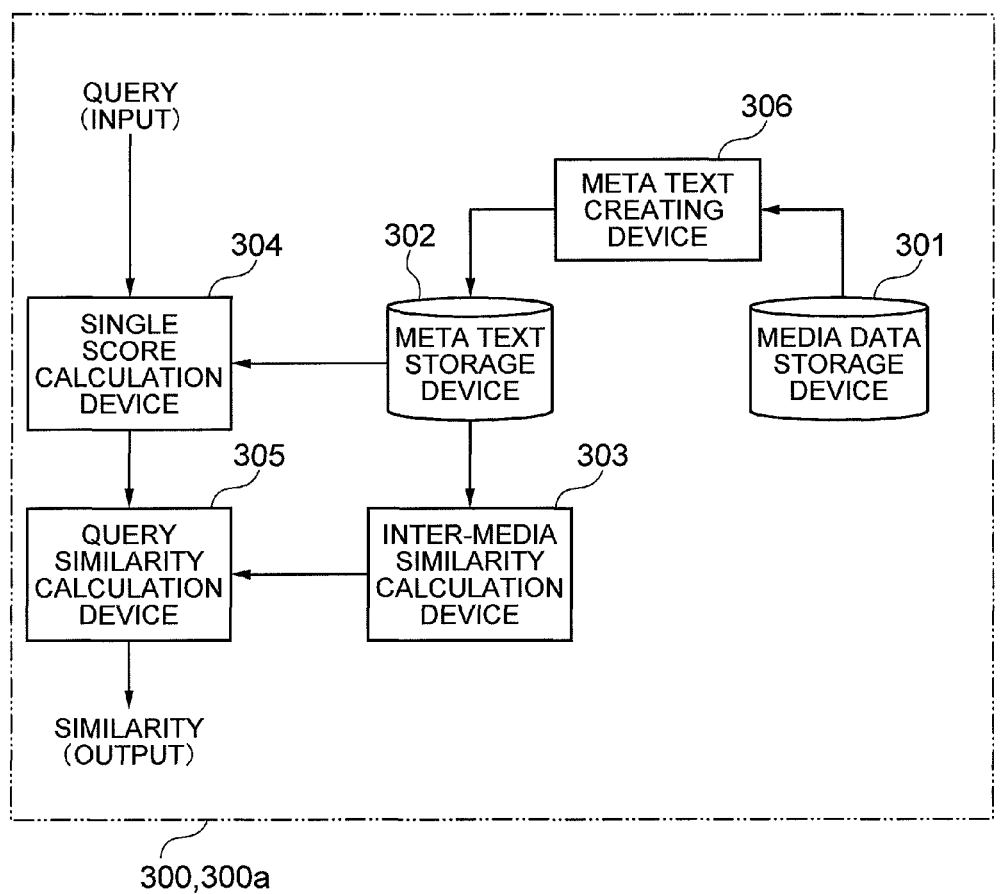
FIG. 3 is a block diagram showing the structure of a third and a fourth best modes for embodying the present invention.

As shown in FIG. 3, the similarity calculation device 300 according to the third exemplary embodiment of the invention is a device for finding the similarity between given media data and a query, which is configured with: a meta text creating device 306 which creates, from the media data, a meta text that shows the contents of the media data; a single score calculation device 304 which calculates a single score that shows similarity between the query and a second media data that is different from the given media data; an inter-media similarity calculating device 303 which calculates inter-media similarity that shows similarity between the given media data and the second media data; and a query similarity calculating device 305 which finds the similarity between the given media data and the query by using the inter-media similarity and the single score regarding the second media data.

A media data storage device 301 stores various media data including the given media data. The meta text creating device 306 creates the meta texts that show the contents of the media data by processing the media data. A meta text storage device 302 stores the media data and meta texts created by the meta text creating device 306 in a related manner.

The inter-media similarity calculation device 303 calculates inter-media similarity that shows the similarity between the given media data and each of the media data stored in the media data storage device 301. The inter-media similarity is calculated by comparing the meta texts stored in the meta text storage device 302.

The single score calculation device 304 calculates the single score that shows the similarity between the query and each of the media data stored in the media data storage device 301. In this exemplary embodiment, the single score is calculated by comparing the query with the meta texts stored in the meta text storage device 302.

The query similarity calculation device 305 calculates the given media data and the query by using the inter-media similarity regarding the given media data that is calculated for each of the media data and by using the similarity regarding the query.

Next, the overall operations of the exemplary embodiment will be described in details by referring to a block diagram of FIG. 3, a flowchart of FIG. 7, and illustrations of a specific example shown in FIG. 12 and FIG. 13.

In the explanations of the exemplary embodiment, it is assumed that the media data storage device 301 stores speech data.

Figure 7:
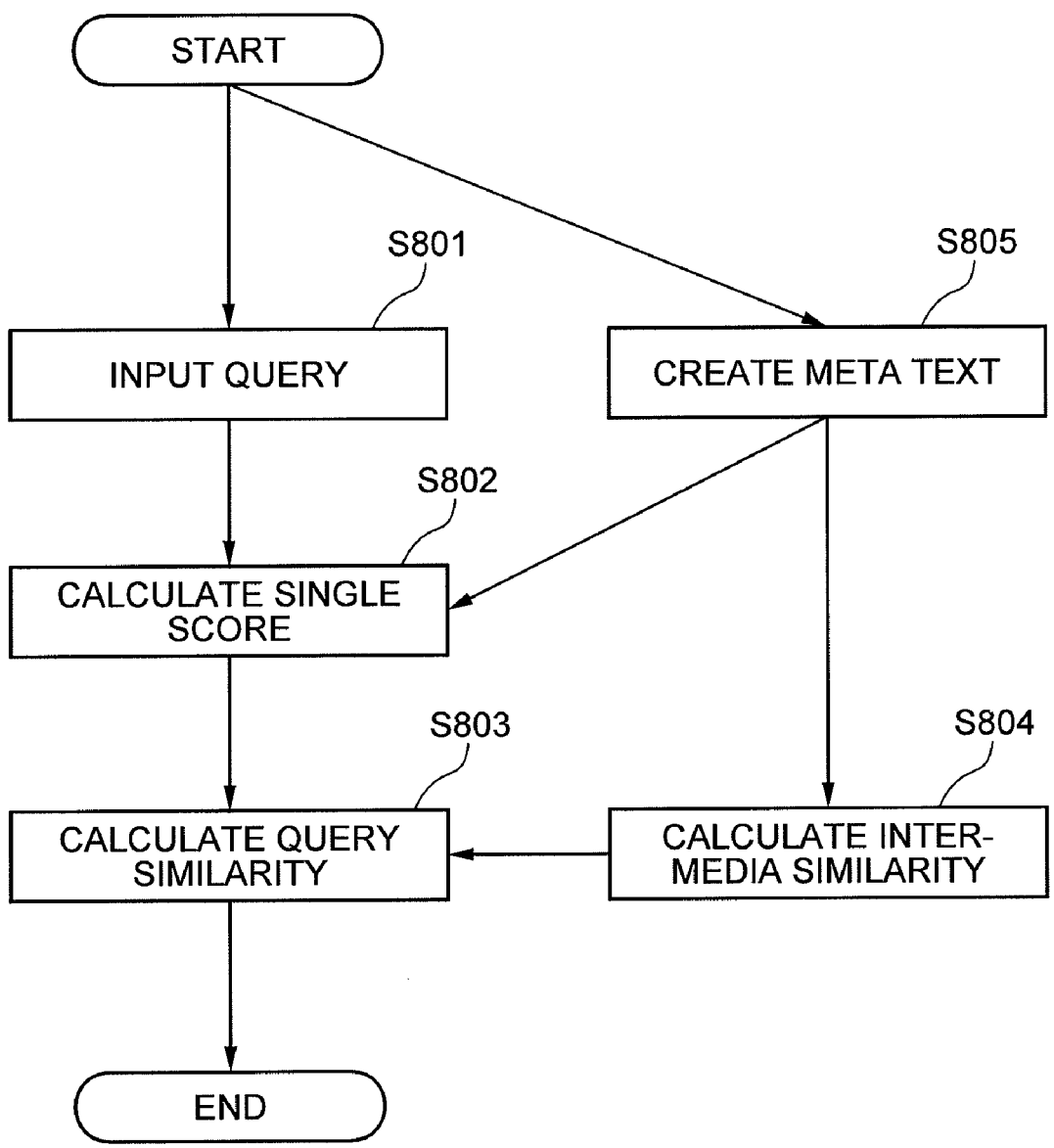
FIG. 7 is a flowchart showing the entire operations of the third best mode for embodying the present invention.

First, the meta text creating device 306 loads the speech data stored in the media data storage device 301, puts the contents of the speech in the speech data into a text by using speech recognition, and stores the recognition result text to the meta text storage device 302 (step 805 of FIG. 7).

Considered herein is a case where a query is inputted for such data (step 801 of FIG. 7), and similarity between given speech data i and the query is obtained. In this exemplary embodiment, it is assumed that the query is a text query. The text query may be inputted through a keyboard, may be inputted by making a speech spoken to a microphone into a text by speech recognition, or may be inputted through making characters drawn by a touch pen into a text by character recognition. Alternatively, this exemplary embodiment may be operated by using a text that is automatically created by some kind of programs as a query.

The inter-media similarity calculation device 303 calculates the inter-media similarity that shows the similarity between the speech data i and each of the image data stored in the media data storage device 301 (step 804 of FIG. 7). The inter-media similarity calculation device 303 finds the similarity between the speech data based on the similarity between the meta texts stored in the meta text storage device 302. The inter-media similarity between the speech data can be calculated by using an already-known technique such as a method using cosine similarity between document vectors. That is, meta texts may be divided into morphemes to extract nouns and verbs, document vectors having the appearance frequencies and tf-idf values as the elements, and the cosine between the document vectors may be taken as the similarity between the meta texts.

In the meantime, the single score calculation device 304 calculates the single score that shows the similarity between the query and each of the speech data stored in the media data storage device 301 (step 802 of FIG. 7). The similarity between the query and the speech data is obtained by comparing the text query with the meta texts stored in the meta text storage device 302. This may be calculated depending on whether or not the query is contained in the meta text or may be calculated based on the appearing number of the query in the meta text. Further, when the query is a document, the above-described cosine similarity between the document vectors may also be used.

The query similarity calculation device 305 obtains the similarity between the speech data i and the query by performing the same processing as that of the query similarity calculation device 305 of the similarity calculation device 100 (step 803 of FIG. 7). That is, provided that the speech data whose similarity with respect to the query is to be found is "i", a set of speech data is "M", the similarity between the speech data i and the speech data j is $d_{ij}$, and the single score of speech data j with respect to query q is s(q, j), the query similarity calculation device 305 calculates the similarity "score(q, i)" between the speech data i and the query q by using Expression 1 or Expression 2, for example. Thereby, when most of the other speech data that have the meta text similar to that of the speech data i are similar to the query q, the similarity "score (q, i)" between the speech data i and the query takes a large value. As a result, it is possible to achieve a similarity calculation that is robust to errors of the meta text of the speech data i itself.

The operations and effects of the exemplary embodiment will be described in a concretive manner by using FIG. 12 and FIG. 13.

Figure 12:
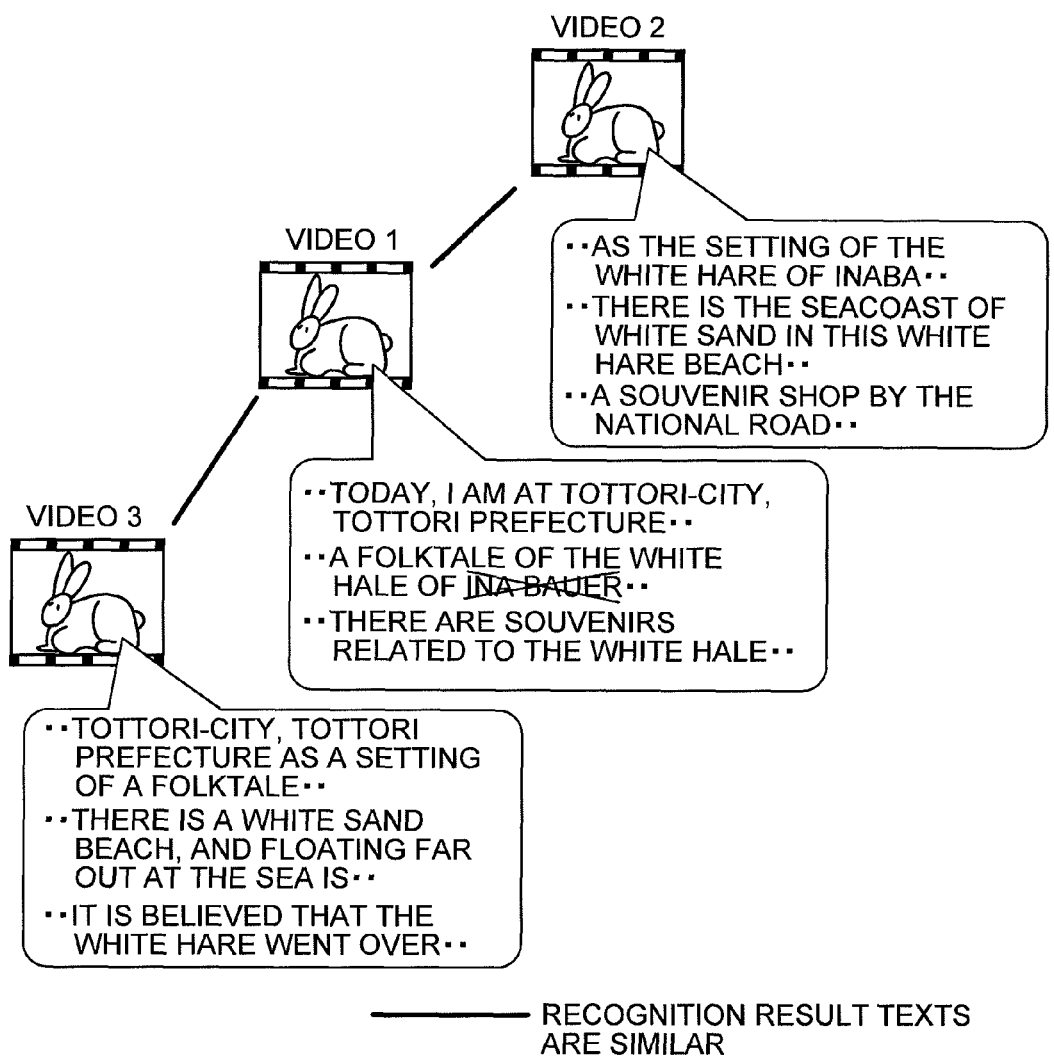
FIG. 12 is an illustration showing a specific example of the third best mode for embodying the present invention.

In FIG. 12, videos 1-3 are videos (moving data with sound) regarding "the White Hare of Inaba" that is one of Japanese myths, and a recognition result text obtained by speech recognition is given to each of the videos. However, "Inaba (correct)" is misrecognized as "Ina Bauer (wrong)" in the video 1. Even though "Inaba" is not correctly recognized in the video 1, it is judged that the video 1 and the videos 2-3 are similar since words such as "hare", "Tottori", "fable", "souvenir", and the like appear in the recognition result, which are in common to the videos 2-3.

Here, considered is to find the similarity with respect to the video 1 by inputting the text query "Ina Bauer" that is one of the technical forms of figure skating. When the meta text of the video 1 and the query are simply compared as it is usually done, the similarity between the video 1 and the query "Ina Bauer" is judged as large even though the video 1 is irrelevant to "Ina Bauer", since "Inaba" is misrecognized as "Ina Bauer" in the meta text of the video 1. As a result, the video 1 may be mistakenly retrieved by the query "Ina Bauer" in an applied case such as a video search or the like.

In this exemplary embodiment of the invention, the single score calculation device 304 calculates the single scores that show the similarity between the query "Ina Bauer" and the other videos 2-3 that are different from the video 1. As a result, each of the single scores obtained thereby becomes small since there is no "Ina Bauer" in the meta texts of the videos 2-3. Therefore, when the query similarity calculation device 305 calculates the similarity between the video 1 and the query "Ina Bauer" with Expression 1, for example, the value obtained thereby becomes small. Thus, it is judged that the video 1 and the query "Ina Bauer" are not similar.

That is, in the case of FIG. 12, similarity calculation robust to errors in the recognition result text can be achieved by utilizing the fact that it can be expected that the possibility of the other videos 2-3 similar to the video 1 to be misrecognized as "Ina Bauer" is small, even if the video 1 happens to be misrecognized as "Ina Bauer" in its speech recognition result.

Figure 13:
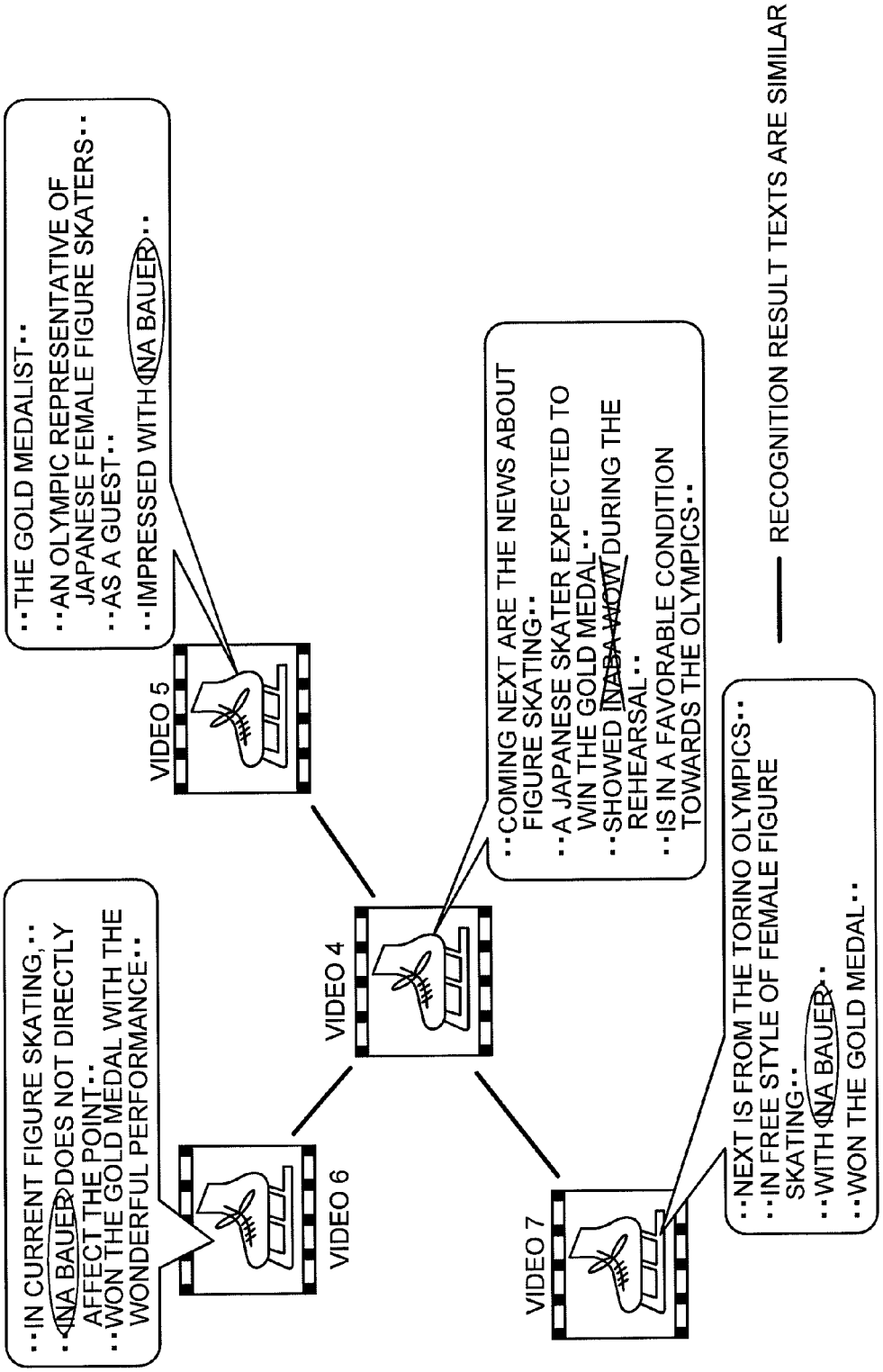
FIG. 13 is an illustration showing a specific example of the third best mode for embodying the present invention.

In the meantime, in FIG. 13, videos 4-7 are videos regarding "Ina Bauer" and a recognition result text obtained by speech recognition is given to each of the videos. However, "Ina Bauer (correct)" is misrecognized as "Inaba wow (wrong)" in the video 4. Even though "Ina Bauer" is not correctly recognized in the video 4, it is judged that the video 4 and the videos 5-7 are similar since words such as "figure skating", "gold medal", "Olympics", and the like appear in the recognition result, which are in common to the videos 5-7. These words are considered as words that tend to appear commonly in topics regarding "Ina Bauer".

Here, considered is to find the similarity with respect to the video 4 by inputting the text query "Ina Bauer". The similarity between the video 4 and the query "Ina Bauer" obtained as the result of direct comparison is judged as small even though the video 4 is a video relevant to "Ina Bauer", since "Ina Bauer" is misrecognized as "Inaba wow" in the meta text of the video 4. As a result, the video 4 may not be able to be retrieved by the query "Ina Bauer" in an applied case such as a video search or the like.

In this exemplary embodiment of the invention, the single score calculation device 304 calculates the single scores that show the similarity between the query "Ina Bauer" and the other videos 5-7 that are different from the video 4. The videos 5-7 having the meta text similar to that of the video 4 are the videos that have similar contents of the meanings as those of the video 4, i.e., the videos related to "Ina Bauer". In this case, there is actually "Ina Bauer" in the meta texts of the videos 5-7, so that the single scores of the videos 5-7 become large. Therefore, when the query similarity calculation device 305 calculates the similarity between the video 4 and the query "Ina Bauer" with Expression 1, for example, the value obtained thereby becomes large. Thus, it is judged that the video 4 and the query "Ina Bauer" are similar.

That is, in the case of FIG. 13, similarity calculation that is robust to errors in the recognition result text can be achieved by utilizing the fact that it can be expected that there is a large possibility of correctly recognizing "Ina Bauer" in the other videos 5-7 that are similar to the video 4, even if it happens that "Ina Bauer" in the video 4 is not recognized correctly.

As described above, it is possible with the exemplary embodiment to find the similarity between the speech data and the query even when recognition errors are contained in the meta text, through utilizing such characteristics that: the meaning contents of the speech data having the similar speech recognition results are also similar; even if a recognition error is contained in the meta text of given speech data, the possibility of having the same error contained in the similar speech data is small; and accuracy of the similarity calculation between the meta texts is not so deteriorated even if there is a small error contained in the meta texts.

While the exemplary embodiment has been described by referring to the case where the speech data are considered as the media data, the present invention is not limited only to such case. For example, when meta texts are created by image recognition or character recognition in a case where the media data are image data or character image data, or when meta texts are created by automatic translation in a case where the media data are text data that are expressed in a language that is different from the text query, the processing that is same as that of the exemplary embodiment can be performed. This makes it possible to perform similar calculation that is robust to errors that cannot be avoided in the image recognition, the character recognition, and the automatic translation.

Next, the effects of the exemplary embodiment will be described.

When finding the similarity between the given media data and the query, the exemplary embodiment uses the similarity between the query and the other media data that are similar to the give media data. Therefore, even if there is an error included in the meta text created from the given media data, the similarity can be judged as small if the media data and the query are irrelevant (case of FIG. 12).

Further, due to the same reason, the similarity can be judged as large if the media data and the query are relevant, even if there is an error included in the meta text created from the given media data (case of FIG. 13).

When the meta text is created automatically from the media data as in this exemplary embodiment, it is unavoidable for the meta text to contain an error. Therefore, the effects obtained by the present invention are extremely significant.

It is needles to say that the use of the similarity calculation device described in this exemplary embodiment makes it possible to improve the search accuracy when conducting a search by the text query through automatically creating the meta text from the media data and to semi-automatically correct the meta text that is created automatically from the media data.

Fourth Exemplary Embodiment

Next, a similarity calculation device 300a according to a fourth exemplary embodiment of the invention will be described in detail by referring to the accompanying drawings.

The similarity calculation device 300a according to the fourth exemplary embodiment of the invention has the same structure as the similarity calculation device 300 shown in FIG. 3. The different points are that: the meta text creating device 306 creates meta texts along with the reliability showing the degree of accuracy of the meta texts; the single score calculation device 304 calculates the single scores with a larger weight given to the meta text that has larger reliability; and the inter-media similarity calculation device 303 calculates the similarity between the media data through calculating the similarity between the meta texts by giving a larger weight on the meta text that has larger reliability.

Next, entire operations of the exemplary embodiment will be described in detail by referring to the block diagram of FIG. 3.

First, the media data storage device 301, the meta text storage device 302, and the query similarity calculation device 305 perform the same operations as each of the devices of the similarity calculation device 300, respectively, so that the explanations thereof are omitted.

When creating the text that shows the contents of the media data, the meta text creating device 306 also outputs the reliability that shows the accuracy of the text. Conventionally, there are some known methods used for obtaining the reliability that shows the accuracy of the output text by speech recognition, character recognition, automatic translation, and the like. For example, a posteriori probability of hypothesis outputted as a result obtained by the speech recognition, the character recognition, or the automatic translation may be taken as the reliability. More simply, a plurality of speech recognition devices, character recognition devices, or automatic translation devices may be prepared, and the consistency of the results may be taken as the reliability. Further, the reliability may be given to the whole meta text or may be given by a word device in the text.

The single calculation device 304 compares the query with the meta text by giving a weight according to the reliability. For example, when a meta text is to be created from video data by using speech recognition, normally the reliability of a part where the recognition accuracy is deteriorated due to an influence of a background noise and the like becomes poor as well. When such meta text of low reliability matches with the query, the single score is evaluated smaller than a normal case. Through this, the accuracy of the single scores can be increased, which results in increasing the accuracy of the similarity between the media data and the query calculated based on the single scores.

Further, the inter-media similarity calculation device 303 calculates the similarity between the media data by calculating the similarity between the meta texts by giving a weight according to the reliability. For example, only the words of high reliability are to be used when creating a document vector from a meta text. Through this, the accuracy of the similarity between the media data can be increased, which results in increasing the accuracy between the media data and the query calculated based thereupon.

This exemplary embodiment uses the reliability of the meta texts both in the single score calculation device 304 and the inter-media similarity calculation device 303. However, the same effects can be obtained without a question even when using the reliability only in the single score calculation device or only in the inter-media similarity calculation device.

Next, effects of the exemplary embodiment will be described.

This exemplary embodiment calculates the single scores of the media data and the similarity between the media data by giving a weight on the meta text of large reliability that shows the accuracy of the meta text, i.e. the meta text with fewer errors. Therefore, accuracy of those can be increased, so that the similarity between the media data and the query can be calculated more accurately.

Fifth Exemplary Embodiment

Next, a similarity calculation device 400 according to a fifth exemplary embodiment of the invention will be described in detail by referring to the accompanying drawings.

Figure 4:
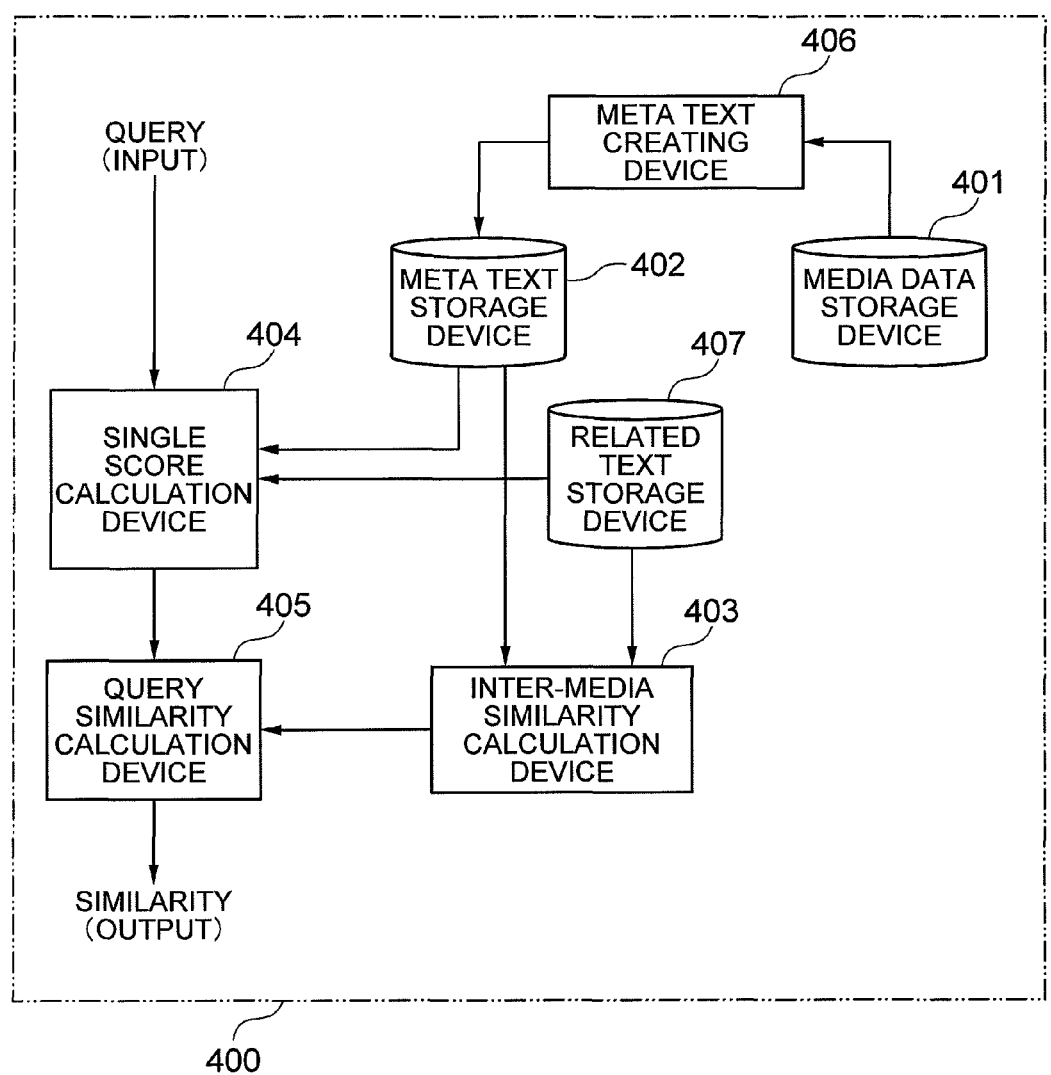
FIG. 4 is a block diagram showing the structure of a fifth best mode for embodying the present invention.

As shown in FIG. 4, the similarity calculation device 400 according to the fifth exemplary embodiment of invention is different from the similarity calculation device 300 in respect that it includes a related text storage device 407 in addition to the structure of the similarity calculation device 300 shown in FIG. 3. A single score calculation device 404 and an inter-media similarity calculation device 403 calculate the single scores and the inter-media similarity for the related texts, and a query similarity calculation device 405 calculates the similarity between the media data and the query by using the inter-media similarity and the single scores for the related texts.

Next, entire operations of the exemplary embodiment will be described in detail by referring to the block diagram of FIG. 4.

First, a media data storage device 401, a meta text creating device 406, and a meta text storage device 402 perform the same operations as each of the devices shown in FIG. 3, so that the explanations thereof are omitted.

The related meta text storage device 407 stores text data whose contents are related to the media data stored in the media data storage device 401. For example, when videos of news programs are used as media data, texts of newspaper articles may be prepared as the related texts. Further, when educational videos are used as the media data, for example, texts of teaching materials may be prepared as the related texts. It is desirable for the text data prepared as the related texts to be the texts of high reliability that has errors of as small number as possible.

The single score calculation device 404 calculates the single score that shows the similarity between the query and each of the related texts stored in the related text storage device 407 in addition to the similarity between the query and each of the media data stored in the media data storage device 401. The calculation method of the single scores for the related texts may be the same calculation method for the media data used in the third exemplary embodiment.

The inter-media similarity calculation device 403 calculates the inter-media similarity for each of the related texts stored in the related text storage device 407 in addition to the inter-media similarity of the media data stored in the media data storage device 401. The calculation method of the inter-media similarity for the related texts may be the same calculation method for the meta texts used in the third exemplary embodiment.

At last, the query similarity calculation device 405 calculates the similarity between the media data and the query by using the inter-media similarity and the single scores of the related texts.

For example, when news program videos are used as the media data, speech recognition is used as the meta text creating means, and newspaper articles is used as the related texts, the above-described structure makes it possible to obtain the similarity between the media data and the query even if unknown word of speech recognition which is never outputted to the meta text (word that is not registered to a dictionary used in the speech recognition and the like) is used as the query, when the unknown word is in the newspaper article prepared as the related texts.

Further, with this exemplary embodiment, the single score calculation device 404 may give a weight in such a manner that the single scores of the related texts become larger than the single scores of the media data. As an extreme example, the single scores of the media data may be set always as "0" to use only the related texts. Through this, the similarity between the media data and the query can be calculated highly accurately when the reliability of the text prepared as the related text is extremely high or when the meta text created from the media data is not so reliable.

Next, effects of the exemplary embodiment will be described.

This exemplary embodiment prepares the text data that are related to the media data. Thus, it is possible to calculate the similarity between the media data and the query even when an unknown word that is never outputted to the meta text created automatically from the media data by using speech recognition, character recognition, automatic translation, or the like is used as the query.

Sixth Exemplary Embodiment

Next, a similarity calculation device 500 according to a sixth exemplary embodiment of the invention will be described in detail by referring to the accompanying drawings.

Figure 5:
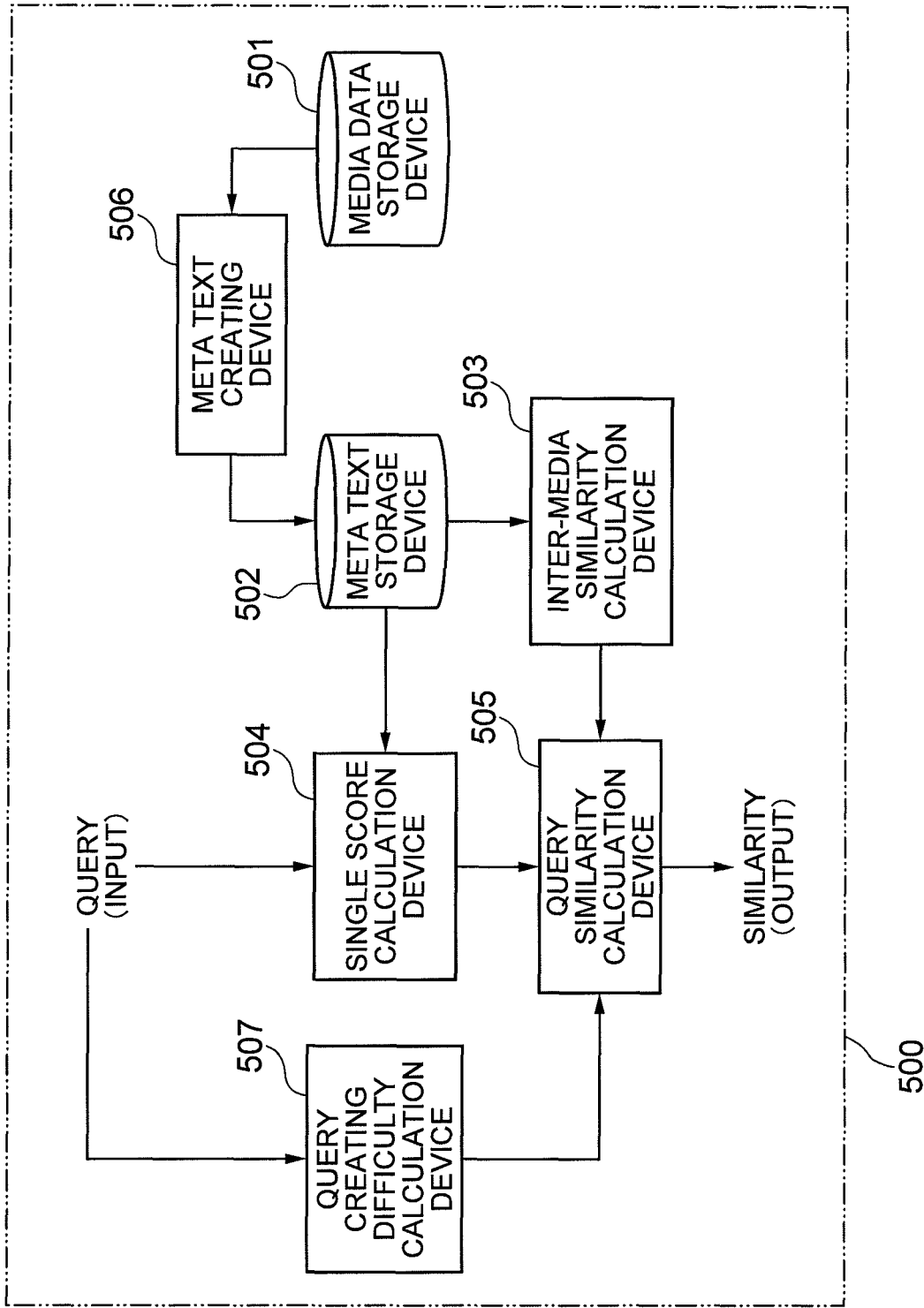
FIG. 5 is a block diagram showing the structure of a sixth best mode for embodying the present invention.

As shown in FIG. 5, the similarity calculation device 500 according to the sixth exemplary embodiment of the invention is a device for finding the similarity between given media data and a query, which includes a query creating difficulty calculation device 507 in addition to the structure of the similarity calculation device 300 shown in FIG. 3.

The query creating difficulty calculation device 507 calculate the difficulty of creating the query with a meta text creating device 506.

A query similarity calculation device 505 calculates the similarity between the given media data and the query by taking the sum of the single scores through giving a heavy weight also on the media data that has small similarity with respect to the given media data when the creating difficulty is large.

Next, entire operations of the exemplary embodiment will be described in detail by referring to the block diagram of FIG. 5.

First, a media data storage device 501, the meta text creating device 506, a meta text storage device 502, an inter-media similarity calculation device 503, and a single score calculation device 504 perform the same operations as each of the devices of the similarity calculation device 300, respectively, so that the explanations thereof are omitted.

The query creating difficulty calculation device 507 calculates the difficulty of creating the query by the meta text creating device. Note here that "high difficulty in creating the query" means that the query cannot be easily created by the meta text creating device. For example, in speech recognition, a word whose appearing probability in a language model is allotted to be extremely low does not easily appear in the recognition result even if that word appears in speech data. Such word is judged as having a large creating difficulty. Unknown words that do not appear in the recognition results may also be judged as having a large creating difficulty.

The query similarity calculation device 505 calculates the similarity between the given media data and the query by taking the sum of the single scores through giving a heavy-weight also on the media data that has small similarity with respect to the given media data when the creating difficulty is large. For example, there is considered a method which sets a small value for the threshold value t in Expression 2 for the query whose creating difficulty by the meta text creating device is large. As another method, the weight function $f(i, j)$ in Expression 1 may be changed in accordance with the creating difficulty.

This makes it possible to obtain the similarity with respect to the given media data to some extent, even if a text that cannot be easily recognized with speech recognition and the like because of its high creating difficulty is inputted as the query.

Further, preparing the related text enables the similarity calculation device 400 to obtain the similarity with respect to the media data even if an unknown word of the meta text creating device is used as the query. In that case, the query creating difficulty calculation device 507 can judge that the creating difficulty is high when the unknown word is used as the query.

Next, effects of the exemplary embodiment will be described.

This exemplary embodiment takes the sum of the single scores through giving a heavy weight also on the media data that has small similarity with respect to the given media data, when calculating the similarity between the given media data and the query that is not easily created by the meta text creating device 506. Therefore, it is possible to obtain the similarity between the media data and the query whose creating difficulty is high.

Seventh Exemplary Embodiment

While the above-described similarity calculation devices 100-500 are built as hardware, the present invention is not limited only to such cases. The similarity calculation devices 100-500 according to the above-described first to sixth exemplary embodiments may also be structured as a software program to be executed by a computer. Such case will be described as a seventh exemplary embodiment.

Figure 8:
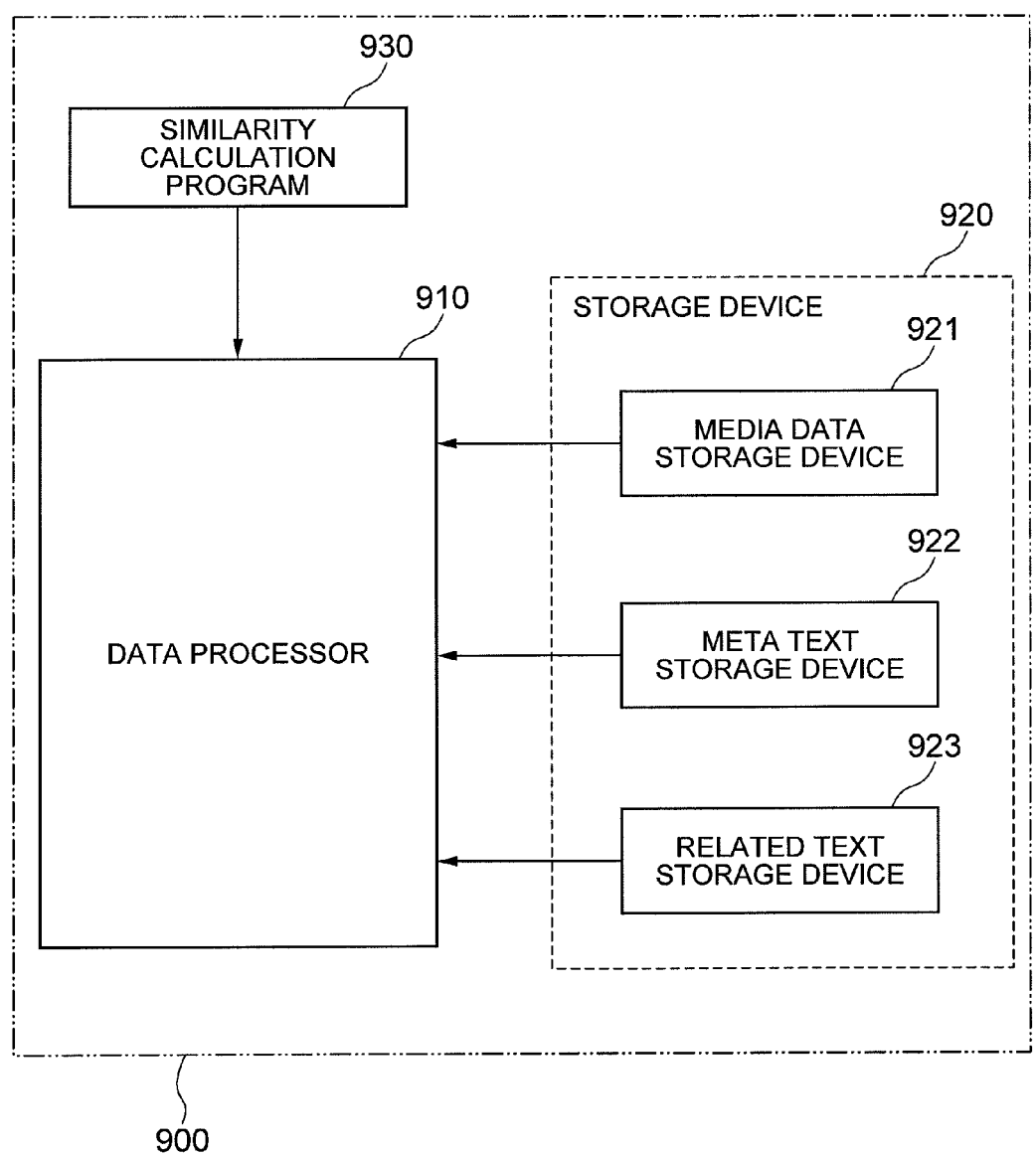
FIG. 8 is a block diagram showing the structure of a seventh best mode for embodying the present invention.

As shown in FIG. 8, a computer 900 has s a data processor 910 that is configured by including an MPU (micro processing unit) and the like, and a storage device 920 that is configured with a magnetic disk, a semiconductor memory, and the like. Further, the computer 900 stores an information search program 930.

The storage device 920 is used as a media data storage device 921, a meta text storage device 922, a related text storage device 923, and the like.

The data processor 910 reads out the information search program 930 and executes the program 930 to virtually achieve the functional devices of the first to sixth exemplary embodiments.

That is, the data processor 910 virtually achieves the single score calculation devices 104, 204, 304, 404, 504, the query similarity calculation devices 105, 205, 305, 405, 505, the inter-media similarity calculation devices 103, 203, 303, 403, 503, the meta text creating devices 306, 406, 506, the query creating difficulty calculation device 507, and the like by controls of the information search program 930.

Figure 14:
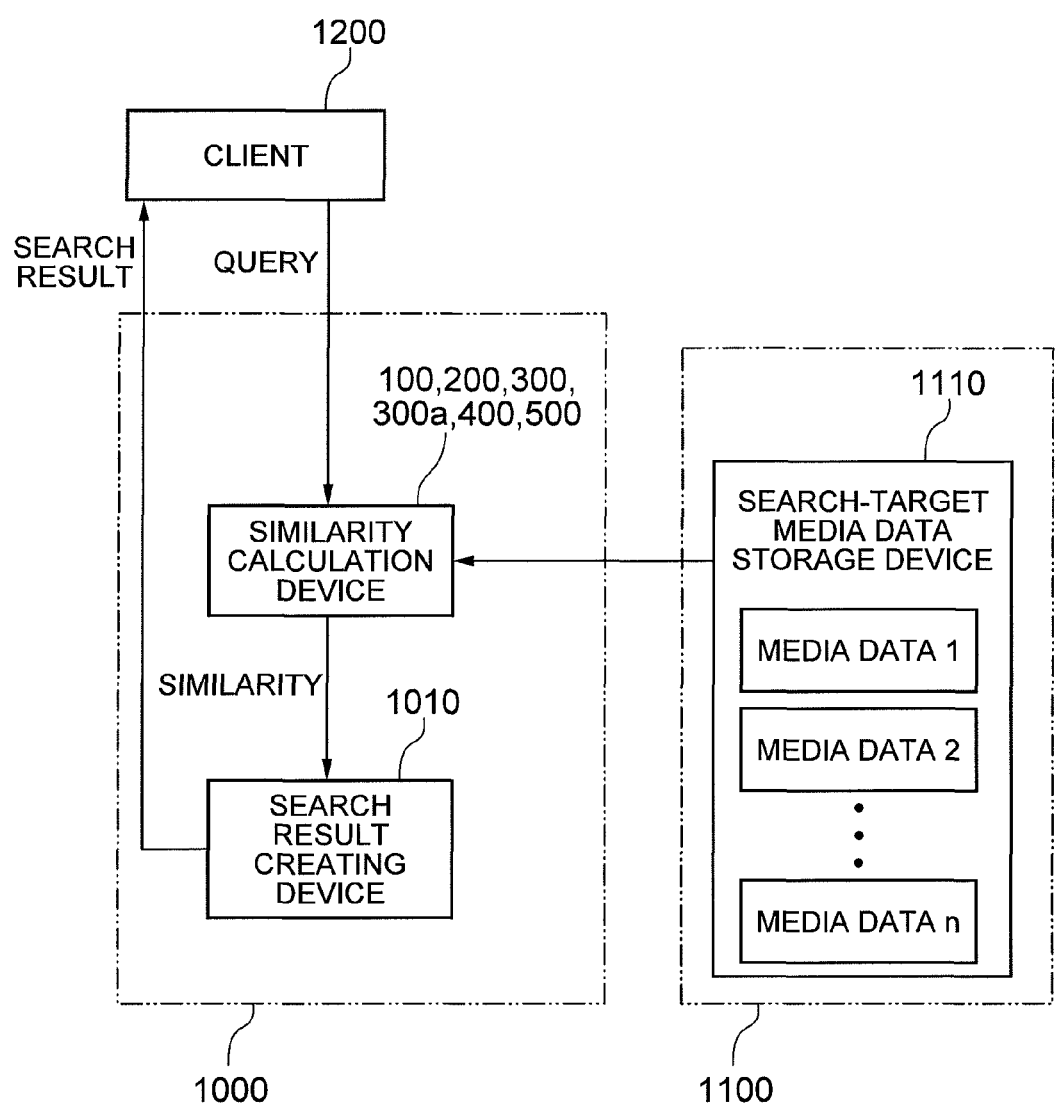
FIG. 14 is a block diagram showing the structure of the seventh best mode for embodying the present invention.

FIG. 14 shows an information search device 1000 and a web server 1100 configured by utilizing the computer 900 that is shown in FIG. 8. The information search device 1000 includes one (written as 100 hereinafter) of the similarity calculation devices 100, 200, 300, 300a, 400, and 500, and a search result creating device 1010.

The information search device 1000 is connected to a client 1200 via a communication network, and the client 1200 is structured to be accessible to the similarity calculation device 100 of the information search device 1000 via the communication network.

When there is an access from the client 1200, the similarity calculation device 100 of the information search device 1000 receives a query from the client 1200, and calculates similarity between the query and each of search-target media data such as media data 1 stored in a search-target media data storage device 1100. That is, the similarity calculation device 100 calculates the similarity between the query and the media data 1 and the like as given media data.

In this case, search-target media data stored in the web server 1100 may be used as other media data, or the media data stored in the media data storage device of the similarity calculation device 100 and the related texts may be used as well.

The search result creating device 1010 creates a search result based on the similarity calculated by the similarity calculation device 100, and returns it to the client 1200. The search result may be formed into a list of URL (Uniform Resource Locator) of media data whose similarity with respect to the query exceeds a prescribed threshold value.

In this exemplary embodiment, there is no limit set in the physical storage positions of the search-target media data, as long as it is a position that can be accessed by the similarity calculation device 100 and the like. For example, the search-target media data may be stored in a storage device built-in to the information search device 1000 or a storage device that is connected to the information search device 1000 via a fiber channel. Further, the search-target media data may be stored to a plurality of devices in a scattered manner.

Further, the query may be inputted from an input device such as a keyboard that is provided to the client 1200, and the search result may be outputted to an output device such as a display device, a printer, or the like.

Next, effects of the exemplary embodiment will be described.

A first effect is that media data irrelevant to the query is not mistakenly searched when searching the media data with the query, even if there is some kind of error contained in the media data or the meta data thereof.

The reason is that the media data is searched by using the similarity calculation device that judges the similarity between the media data and the query as small when the media data and the query are irrelevant, even if there is some kind of error contained in the media data or the meta data thereof.

A second effect is that, when searching the media data with the query, it is possible to correctly search the media data that is related to the query even if there is some kind of error contained in the media data or the meta data thereof.

The reason is that the media data is searched by using the similarity calculation device that judges the similarity between the media data and the query as large as long as the media data and the query are relevant, even if there is some kind of error contained in the media data or the meta data thereof.

Next, another exemplary embodiment of the present invention will be described.

Second media data may be configured with a plurality of media data, the single score calculation device may calculate the single scores for each of the media data included in the second media data, the inter-media similarity calculation device may calculate the inter-media similarity for each of the media data, and the query similarity calculation device may operate to find the similarity between the given media data and the query by using the inter-media similarity and the single scores of each of the media data.

The query similarity calculation device may operate to take the weighted sum of the single scores of each of the media data in accordance with the inter-media similarity of each of the media data contained in the second media data as the similarity between the given media data and the query.

The inter-media similarity calculation device may operate to calculate the similarity between the meta texts that show the contents of the media data.

A text query may be used as the query, and the single score calculation device may operate to calculate the single scores by comparing the text query with the meta texts that show the contents of the media data.

A text query may be used as the query and the single score calculation device may operate to calculate the single scores by comparing the text query with the meta texts that show the contents of the media data, and the inter-media similarity calculation device may operate to calculate the similarities between the meta texts.

A meta text creating device for automatically creating the meta texts from the media data may also be provided.

The meta text creating device may create the meta text along with the reliability that shows the accuracy of the meat text, and the inter-media similarity calculation device may operate to calculate the inter-media similarity through calculating the similarity between the meta texts by giving a large weight on the meta text of large reliability.

The meat text creating device may create the meta text along with the reliability that shows the accuracy of the meat text, and the single score calculation device may operate to calculate the single scores by giving a large weight on the meta text of large reliability.

A query creating difficulty calculation device for calculating the creating difficulty of the text that is the same as the text query by the meta text creating device may be provided further, and the query similarity calculation device may operate to obtain the similarity between the given media data and the query by using the inter-media similarity, the single scores, and the creating difficulty of the second media data.

The meta text creating device may create the meta texts by using a dictionary, and the query creating difficulty calculation device may operate to show a large creating difficulty when the text query is an unknown word that is not registered to the dictionary.

Speech data may be used as the media data, and the meta text creating device may operate to create the meta texts by putting the speech data into a text by speech recognition.

Image data may be used as the media data, and the meta text creating device may operate to create the meta texts by putting the image data into a text by image recognition or character recognition. Note here that "image data" includes data of still pictures and data of moving pictures both.

A text data expressed with a language different from the text query may be used as the media data, and the meta text creating device may operate to create the meta text by converting the text data to a text of the same language as that of the text query by automatic translation.

A related text storage device for storing the related texts of given media data may be provided further, and the single score calculation device, the inter-media similarity calculation device, and the query similarity calculation device may operate to use the related texts as the second media data.

As the information search device, it is possible to include a similarity calculation device which calculates the similarity between the query and each of the search-target media data as the media data, and to include a search result crating device for creating the search result for the query based on the similarity.

While the present invention of the current Application has been described above by referring to the embodiments (and examples), it is not intended to limit the present invention to those embodiments and examples. Various modifications that occur to those skilled in the art within the scope of the present invention can be applied to the structures and the details of the present invention.

INDUSTRIAL APPLICABILITY

The present invention can be applied to usages such as an information search system which efficiently searches and watches/listens a vast amount of various media data such as video and sound stored on a server of the Internet or stored in AV personal computers, hard disk recorders, and the like belonging to individuals, and to a program for enabling computers to achieve the information search system. Further, the present invention can also be applied to a usage such as an information sharing system in a company, which efficiently searches and manages minutes of meetings, educational videos, and the like. Furthermore, the present invention can also be applied to a usage such as a meta data creating aid system for improving the efficiency of a meta data giving work to the various media data.

REFERENCE NUMERALS

100 Similarity calculation device
101 Media data storage device
102 Meta text storage device
103 Inter-media similarity calculation device
104 Single score calculation device
105 Query similarity calculation device
200 Similarity calculation device
201 Media data storage device
202 Meta text storage device
203 Inter-media similarity calculation device
204 Single score calculation device
205 Query similarity calculation device
300 Similarity calculation device
300a Similarity calculation device
301 Media data storage device
302 Meta text storage device
303 Inter-media similarity calculation device
304 Single score calculation device
305 Query similarity calculation device
306 Meta text creating device
400 Similarity calculation device
401 Media data storage device
402 Meta text storage device
403 Inter-media similarity calculation device
404 Single score calculation device
405 Query similarity calculation device
406 Meta text creating device
407 Related text storage device
500 Similarity calculation device
501 Media data storage device
502 Meta text storage device
503 Inter-media similarity calculation device
504 Single score calculation device
505 Query similarity calculation device
506 Meta text creating device
507 Query creating difficulty calculation device
600 Information search device
601 Input device
602 Speech recognition device
603 Expansion key extraction device
604 Expansion word extraction device
605 Related information search device
606 External database
607 Speech document description creating device
608 Output device
900 Computer
910 Data processor
920 Storage device
921 Media data storage device
922 Meta text storage device
923 Related text storage device
930 Similarity calculation program
1000 Information search device
1010 Search result creating device
1100 Web server
1110 Search-target media data storage device
1200 Client

The invention claimed is:
1. A similarity calculation device for obtaining similarity between a first media data and a text query, the first media data having first meta text including a plurality of words describing contents of the first media data, the similarity calculation device comprising:

a single score calculation device which calculates a single score that shows similarity between the text query and a second meta text of a second media data by comparing the text query with the second meta text, the second meta text including a plurality of words describing contents of the second media data;

an inter-media similarity calculation device which calculates inter-media similarity that shows similarity between the first meta text of the first media data and the second meta text of the second media data by comparing the plurality of words of the first meta text with the plurality of words of the second meta text;

a query similarity calculation device which obtains similarity between the first media data and the text query by using the inter-media similarity and the single score, a meta text creating device which creates meta text including the first meta text and the second meta text based on the first media data and the second media data, respectively, wherein the first meta text includes an error, and the second meta text includes fewer errors than the first meta text; and a query creating difficulty calculation device which calculates a creating difficulty of a text that is same as the text query with the meta text creating device, wherein the query similarity calculation device calculates the similarity between the first media data and the text query by using the inter-media similarity and the single scores of the second media data as well as the creating difficulty, wherein:

the meta text creating device creates the meta text by using a dictionary, and the query creating difficulty calculation device calculates the creating difficulty as large, when the text query is an unknown word that is not registered to the dictionary.

2. The similarity calculation device as claimed in claim 1, wherein:

the second media data is constituted with a plurality of media data;

the single score calculation device calculates the single score for each of the media data contained in the second media data;

the inter-media similarity calculation device calculates the inter-media similarity for each of the media data; and the query similarity calculation device calculates the similarity between the first media data and the text query by using the inter-media similarity and the single scores of each of the media data.

3. The similarity calculation device as claimed in claim 2, wherein the query similarity calculation device calculates the similarity between the first media data and the text query by taking a weighted sum of the single scores of each of the media data in accordance with the inter-media similarity between each of the media data contained in the second media data.

4. The similarity calculation device as claimed in claim 1, wherein: the meta text creating device creates the meta text along with reliability that shows accuracy of the meta text; and the inter-media similarity calculation device calculates the inter-media similarity by giving a large weight on the meta text whose reliability is large.

5. The similarity calculation device as claimed in claim 1, wherein:

the meta text creating device creates the meta text along with reliability that shows accuracy of the meta text; and the single score calculation device calculates the single scores by giving a large weight on the meta text whose reliability is large.

6. The similarity calculation device as claimed in claim 1, wherein:

the media data is speech data; and the meta text creating device creates the meta text by putting the speech data into a text by speech recognition.

7. The similarity calculation device as claimed in claim 1, wherein:

the media data is image data; and the meta text creating device creates the meta text by putting the image data into a text by image recognition or character recognition.

8. The similarity calculation device as claimed in claim 1, wherein:

the media data is text data that is expressed with a language different from that of the text query; and the meta text creating device creates the meta text by converting the text data into a text of a same language as that of the text query by automatic translation.

9. The similarity calculation device as claimed in claim 1, further comprising a related text storage device for storing a related text whose contents are related to the first media data, wherein the single score calculation device and the inter-media similarity calculation device use the related text as the second media data; and the inter-media similarity calculation device calculates the inter-media similarity by using the related text itself as a meta text of the related text.

10. An information search device, comprising:

the similarity calculation device claimed in claim 1, which calculates the similarity between the text query and each research-target media data taken as the first media data; and a search result creating device which creates a search result for the text query based on the similarity.

11. An information search method, comprising the similarity calculation device claimed in claim 1, wherein the similarity calculation device:

calculates the similarity between the query and each research-target media data taken as the first media data; and creates a search result for the text query based on the similarity.

12. A non-transitory computer readable recording medium storing an information search program, comprising the similarity calculation device claimed in claim 1, which enables a computer to execute:

by the similarity calculation device, a function of calculating the similarity between the text query and each research-target media data taken as the first media data; and a function of creating a search result for the text query based on the similarity.

13. A similarity calculation method for obtaining similarity between a first media data and a text query, the first media data having first meta text including a plurality of words describing contents of the first media data, the method comprising:

calculating a single score that shows similarity between the text query and second meta text of a second media data by comparing the text query with the second meta text, the second meta text including a plurality of words describing contents of the second media data;

calculating inter-media similarity that shows similarity between the first meta text of the first media data and the second meta text of the second media data by comparing the plurality of words of the first meta text with the plurality of words of the second meta text;

obtaining the similarity between the first media data and the text query by using the inter-media similarity and the single score;

creating meta text including the first meta text and the second meta text based on the first media data and the second media data, respectively, wherein the first meta text includes an error, and the second meta text includes fewer errors than the first meta text;

calculating a creating difficulty of a text that is same as the text query;

calculating the similarity between the first media data and the text query by using the inter-media similarity and the single scores of the second media data as well as the creating difficulty;

creating the meta text by using a dictionary; and calculating the creating difficulty as large, when the text query is an unknown word that is not registered to the dictionary.

14. The similarity calculation method as claimed in claim 13, which:

uses the second media data that is constituted with a plurality of media data;

calculates the single score for each of the media data contained in the second media data;

calculates the inter-media similarity for each of the media data; and calculates the similarity between the first media data and the text query by using the inter-media similarity and the single scores of each of the media data.

15. The similarity calculation method as claimed in claim 14, which calculates the similarity between the first media data and the text query by taking a weighted sum of the single scores of each of the media data in accordance with the inter-media similarity between each of the media data contained in the second media data.

16. The similarity calculation method as claimed in claim claim 13, which:

creates the meta text along with reliability that shows accuracy of the meta text; and calculates the inter-media similarity by giving a large weight on the meta text whose reliability is large.

17. The similarity calculation method as claimed in claim 13, which:

creates the meta text along with reliability that shows accuracy of the meta text; and calculates the single scores by giving a large weight on the meta text whose reliability is large.

18. The similarity calculation method as claimed in claim 13, which:

uses the media data that is speech data; and creates the meta text by putting the speech data into a text by speech recognition.

19. The similarity calculation method as claimed in claim 13, which:

uses the media data that is image data; and creates the meta text by putting the image data into a text by image recognition or character recognition.

20. The similarity calculation method as claimed in claim 13, which:

uses the media data that is text data expressed with a language different from that of the text query; and creates the meta text by converting the text data into a text of a same language as that of the text query by automatic translation.

21. The similarity calculation method as claimed in claim 13, which:

calculates the single score and the inter-media similarity by using uscs a related text whose contents are related to the first media data as the second media; and calculates the inter-media similarity by using the related text itself as a meta text of the related text.

22. A non-transitory computer readable recording medium storing a similarity calculation program for obtaining similarity between media data and a query, the program causing a computer to execute:

a function for calculating a single score a that shows similarity between the text query and second meta text of a second media data by comparing the text query with the second meta text, the second meta text including a plurality of words describing contents of the second media data;

a function for calculating inter-media similarity that shows similarity between the first meta text of the first media data and the second meta text of the second media data by comparing the plurality of words of the first meta text of the first media data with the plurality of words of the second meta text of the second media data;

a function for obtaining the similarity between the first media data and the text query by using the inter-media similarity and the single score, a function of creating meta text including the first meta text and the second meta text based on the first media data and the second media data, respectively, wherein the first meta text includes an error, and the second meta text includes fewer errors than the first meta text;

a function of calculating a creating difficulty of a text that is same as the text query with the meta text creating device;

a function of calculating the similarity between the first media data and the text query by using the inter-media similarity and the single scores of the second media data as well as the creating difficulty;

a function of creating the meta text by using a dictionary; and a function of calculating the creating difficulty as large, when the text query is an unknown word that is not registered to the dictionary.

23. The non-transitory computer readable recording medium storing the similarity calculation program as claimed in claim 22, which enables the computer to execute:

a function of calculating the single score for each of media data contained in the second media data constituted with a plurality of media data;

a function of calculating the inter-media similarity for each of the media data; and a function of calculating the similarity between the first media data and the text query by using the inter-media similarity and the single scores of each of the media data.

24. The non-transitory computer readable recording medium storing the similarity calculation program as claimed in claim 23, which enables the computer to execute: a function of calculating the similarity between the first media data and the text query by taking a weighted sum of the single scores of each of the media data in accordance with the inter-media similarity between each of the media data contained in the second media data.

25. The non-transitory computer readable recording medium storing the similarity calculation program as claimed in claim 22, which enables the computer to execute:
- a function of creating the meta text along with reliability that shows accuracy of the meta text; and
- a function of calculating the inter-media similarity by giving a large weight on the meta text whose reliability is large.

26. The non-transitory computer readable recording medium storing the similarity calculation program as claimed in claim 22, which enables the computer to execute:
- a function of creating the meta text along with reliability that shows accuracy of the meta text; and
- a function of calculating the single scores by giving a large weight on the meta text whose reliability is large.

27. The non-transitory computer readable recording medium storing the similarity calculation program as claimed in claim 22, which enables the computer to execute a function of creating the meta text by putting the media data that is speech data into a text by speech recognition.

28. The non-transitory computer readable recording medium storing the similarity calculation program as claimed in claim 22, which enables the computer to execute a function of creating the meta text by putting image data that is the media data into a text by image recognition or character recognition.

29. The non-transitory computer readable recording medium storing the similarity calculation program as claimed in claim 22, which enables the computer to execute a function of creating the meta text by converting the text data into a text of a same language as that of the text query by automatic translation by using the media data that is text data expressed with a language different from that of the text query.

30. The non-transitory computer readable recording medium storing the similarity calculation program as claimed in claim 22, which enables the computer to execute a function of calculating the single score and the inter-media similarity by using a related text whose contents are related to the first media data as the second media data, and a function of calculating the inter-media, similarity by using the related text itself as a meta text of the related text.

31. A system for obtaining similarity between a first media data and a text query, the first media data having first meta text including a plurality of words describing contents of the first media data, the system comprising:
- single score calculation means for calculating a single score that shows similarity between the text query and second meta text of a second media data by comparing the text query with the second meta text, the second meta text including a plurality of words describing contents of the second media data;
- inter-media similarity calculation means for calculating inter-media similarity that shows similarity between the first meta text of the first media data and the second meta text of the second media data by comparing the plurality of words of the first meta text with the plurality of words of the second meta text;
- query similarity calculation means for obtaining similarity between the first media data and the text query by using the inter-media similarity and the single score;
- a meta text creating device which creates meta text including the first meta text and the second meta text based on the first media data and the second media data, respectively, wherein the first meta text includes an error, and the second meta text includes fewer errors than the first meta text; and
- a query creating difficulty calculation device which calculates a creating difficulty of a text that is same as the text query with the meta text creating device, wherein the query similarity calculation device calculates the similarity between the first media data and the text query by using the inter-media similarity and the single scores of the second media data as well as the creating difficulty, wherein:
the meta text creating device creates the meta text by using a dictionary, and
the query creating difficulty calculation device calculates the creating difficulty as large, when the text query is an unknown word that is not registered to the dictionary.

\* \* \* \* \*